(12) United States Patent
Elsherif et al.

(10) Patent No.: US 9,806,775 B2
(45) Date of Patent: Oct. 31, 2017

(54) MULTI-USER MULTIPLE-INPUT-MULTIPLE-OUTPUT GROUPINGS OF STATIONS

(71) Applicant: QUALCOMM Incorporated, San Diego, CA (US)

(72) Inventors: Ahmed Ragab Elsherif, Santa Clara, CA (US); Qinghai Gao, Sunnyvale, CA (US); Eugene Baik, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/141,380

(22) Filed: Apr. 28, 2016

(65) Prior Publication Data

US 2017/0063437 A1   Mar. 2, 2017

Related U.S. Application Data

(63) Continuation-in-part of application No. 14/842,592, filed on Sep. 1, 2015, now Pat. No. 9,590,707.

(60) Provisional application No. 62/240,343, filed on Oct. 12, 2015.

(51) Int. Cl.
*H04B 7/0452* (2017.01)
*H04L 5/00* (2006.01)

(52) U.S. Cl.
CPC .......... *H04B 7/0452* (2013.01); *H04L 5/006* (2013.01)

(58) Field of Classification Search
CPC .. H04B 7/0691; H04B 7/0602; H04B 7/0452; H04B 7/0417; H04B 7/0617; H04L 5/006

USPC .................. 375/267, 299, 346–349
See application file for complete search history.

(56) References Cited

U.S. PATENT DOCUMENTS

| | | | |
|---|---|---|---|
| 7,593,489 B2 | 9/2009 | Koshy et al. | |
| 8,320,479 B2 | 11/2012 | Balachandran et al. | |
| 8,520,576 B2 | 8/2013 | Kim et al. | |

(Continued)

FOREIGN PATENT DOCUMENTS

| | | |
|---|---|---|
| WO | WO-2013104428 A1 | 7/2013 |
| WO | WO-2014151546 A1 | 9/2014 |

OTHER PUBLICATIONS

Lv et al., "Low Complexity Scheduling Technique for Multi-User MIMO Systems," 2008 IEEE Vehicular Technology Conference, VTC Spring 2008, Singapore, May 11-14, 2008, pp. 1345-1349, ISBN 978-1-4244-1645-5, Institute of Electrical and Electronics Engineers.

(Continued)

*Primary Examiner* — Emmanuel Bayard
(74) *Attorney, Agent, or Firm* — Holland & Hart LLP

(57) ABSTRACT

Methods, systems, and devices are described for wireless communication. In one aspect, a method of wireless communication includes selecting, by a wireless device, a first subset from a first set of candidate multi-user groups of stations. The first subset is based at least in part on first-level grouping metrics associated with the first set of candidate multi-user groups. The method further includes determining second-level grouping metrics associated with a second set of candidate multi-user groups. The second set corresponds to candidate multi-user groups having a greater number of stations or channel vectors than the first set, and the second set is based at least in part on the first subset.

30 Claims, 15 Drawing Sheets

(56) References Cited

U.S. PATENT DOCUMENTS

| | | | |
|---|---|---|---|
| 8,600,393 B2* | 12/2013 | Liu | H04W 16/14 |
| | | | 370/329 |
| 8,798,184 B2 | 8/2014 | Su et al. | |
| 8,824,386 B2 | 9/2014 | Pare, Jr. et al. | |
| 8,902,921 B2 | 12/2014 | Liu et al. | |
| 9,055,603 B2 | 6/2015 | Rosenqvist et al. | |
| 9,332,449 B2 | 5/2016 | Park et al. | |
| 9,590,707 B1 | 3/2017 | Baik et al. | |
| 2005/0289256 A1* | 12/2005 | Cudak | H04L 1/0009 |
| | | | 710/62 |
| 2006/0018288 A1* | 1/2006 | Luo | H04B 7/0691 |
| | | | 370/334 |
| 2007/0140363 A1 | 6/2007 | Horng et al. | |
| 2007/0253386 A1* | 11/2007 | Li | H04L 1/0026 |
| | | | 370/338 |
| 2009/0046629 A1* | 2/2009 | Jiang | H04J 13/0059 |
| | | | 370/328 |
| 2009/0279445 A1* | 11/2009 | Nogami | H04L 5/006 |
| | | | 370/252 |
| 2010/0054113 A1 | 3/2010 | Haardt et al. | |
| 2010/0183065 A1* | 7/2010 | Siti | H04L 25/067 |
| | | | 375/233 |
| 2010/0306613 A1* | 12/2010 | Wu | H04B 7/0452 |
| | | | 714/752 |
| 2011/0064271 A1* | 3/2011 | Wang | G06T 7/30 |
| | | | 382/103 |
| 2011/0310827 A1 | 12/2011 | Srinivasa et al. | |
| 2012/0027139 A1* | 2/2012 | Khayrallah | H04L 5/0023 |
| | | | 375/347 |
| 2012/0044990 A1* | 2/2012 | Bivolarsky | H04N 19/105 |
| | | | 375/240.03 |
| 2012/0069768 A1* | 3/2012 | Ghassemzadeh | H04B 7/061 |
| | | | 370/252 |
| 2012/0076028 A1* | 3/2012 | Ko | H04L 1/0026 |
| | | | 370/252 |
| 2013/0034000 A1* | 2/2013 | Huo | H04L 25/03343 |
| | | | 370/252 |
| 2013/0148613 A1* | 6/2013 | Han | H04L 1/0026 |
| | | | 370/329 |
| 2013/0279403 A1 | 10/2013 | Takaoka et al. | |
| 2013/0308713 A1 | 11/2013 | Zhang | |
| 2014/0010080 A1* | 1/2014 | Zubow | H04B 7/0417 |
| | | | 370/230 |
| 2014/0056204 A1 | 2/2014 | Suh et al. | |
| 2014/0133303 A1* | 5/2014 | Jia | H04L 1/0002 |
| | | | 370/232 |
| 2014/0177747 A1 | 6/2014 | Ruiz et al. | |
| 2014/0185564 A1 | 7/2014 | Dong et al. | |
| 2014/0254517 A1 | 9/2014 | Nam et al. | |
| 2014/0278834 A1* | 9/2014 | Lautz | G06Q 30/0203 |
| | | | 705/12 |
| 2014/0301240 A1 | 10/2014 | Park et al. | |
| 2014/0369220 A1 | 12/2014 | Fan et al. | |
| 2015/0003262 A1* | 1/2015 | Eder | H04B 7/0452 |
| | | | 370/252 |
| 2015/0085944 A1* | 3/2015 | Mobasher | H04B 7/0691 |
| | | | 375/267 |
| 2015/0087237 A1* | 3/2015 | Shang | H04B 1/1027 |
| | | | 455/63.1 |
| 2015/0092573 A1* | 4/2015 | Zhang | H04W 24/10 |
| | | | 370/252 |
| 2015/0195018 A1* | 7/2015 | Xiao | H04B 7/063 |
| | | | 375/267 |
| 2015/0372795 A1 | 12/2015 | Wu et al. | |
| 2016/0072562 A1* | 3/2016 | Onggosanusi | H04B 7/0478 |
| | | | 370/329 |
| 2016/0142726 A1* | 5/2016 | Han | H04N 19/503 |
| | | | 375/240.12 |
| 2016/0204960 A1 | 7/2016 | Yu | |
| 2016/0234855 A1* | 8/2016 | Panteleev | H04W 36/0055 |
| 2016/0295513 A1 | 10/2016 | Moon et al. | |
| 2016/0295573 A1* | 10/2016 | Lee | H04L 1/0026 |
| 2016/0330732 A1 | 11/2016 | Moon et al. | |
| 2016/0345343 A1 | 11/2016 | Elsherif et al. | |
| 2017/0033898 A1 | 2/2017 | Chun et al. | |
| 2017/0063438 A1 | 3/2017 | Baik et al. | |
| 2017/0064566 A1 | 3/2017 | Elsherif et al. | |
| 2017/0064568 A1 | 3/2017 | Elsherif et al. | |

OTHER PUBLICATIONS

Spencer et al., "Channel Allocation in Multi-user MIMO Wireless Communications Systems," 2004 IEEE International Conference on Communications, Jun. 20-24, 2004, pp. 3035-3039, vol. 5, XP_10709760A, Institute of Electrical and Electronics Engineers.

Xie et al., "Scalable User Selection for MU-MIMO Networks," IEEE INFOCOM 2014—IEEE Conference on Computer Communications, Toronto, ON, Apr. 27, 2014-May 2, 2014, pp. 808-816, ISBN 978-1-4799-3360-0, Institute of Electrical and Electronics Engineers.

Yi et al., "User Scheduling for Heterogeneous Multiuser MIMO Systems: a Subspace Viewpoint," IEEE Transactions on Vehicular Technology, Aug. 25, 2011, 10 pgs., vol. 60, Issue 8, Institute of Electrical and Electronics Engineers.

ISA/EP, International Search Report and Written Opinion of the International Searching Authority, Int'l Application No. PCT/US2016/046831, dated Nov. 7, 2016, European Patent Office, Rijswijk, NL, 14 pgs.

* cited by examiner

MULTI-USER MULTIPLE-INPUT-MULTIPLE-OUTPUT GROUPINGS OF STATIONS

CROSS REFERENCES

The present application for patent claims priority to U.S. Provisional Patent Application No. 62/240,343 by Elsherif et al., entitled "Multi-User Multiple-Input-Multiple-Output Grouping," filed Oct. 12, 2015; and is also a continuation-in-part of U.S. patent application Ser. No. 14/842,592 by Baik et al., entitled "Using Compressed Beamforming Information for Optimizing Multiple-Input Multiple-Output Operations," filed Sep. 1, 2015; each of which is assigned to the assignee hereof and expressly incorporated by reference herein.

BACKGROUND

Field of the Disclosure

The present disclosure, for example, relates to wireless communication systems, and more particularly to techniques for using compressed or non-compressed beamforming information ("beamforming information") for optimizing multiple-input multiple-output (MIMO) operations.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless local area network (WLAN) is an example of a multiple-access system and are widely deployed and used. Other examples of multiple-access systems may include code-division multiple access (CDMA) systems, time-division multiple access (TDMA) systems, frequency-division multiple access (FDMA) systems, and orthogonal frequency-division multiple access (OFDMA) systems.

A WLAN, such as a Wi-Fi (IEEE 802.11) network, may include an access point (AP) that may communicate with one or more stations (STAs) or mobile devices. In some cases, the AP may communicate with more than one STA simultaneously in a multi-user MIMO (MU-MIMO) transmission. The AP may assign a group of STAs to a MU-MIMO group and send a MIMO transmission to the group of STAs assigned to the MU-MIMO group. With opportunistic scheduling, the AP may change the STAs assigned to the MU-MIMO group during every sounding period based at least in part on, for example, availability of traffic, modulation and coding scheme (MCS) compatibility, etc. However, when a STA is grouped with other STAs in a MU-MIMO groups that are incompatible (e.g., where each STA in the MU-MIMO group has high channel correlation), the packet error rate (PER) for the MU-MIMO group may increase for the group due to inter-user interference.

SUMMARY

The present description discloses techniques for using compressed or non-compressed beamforming information for optimizing MIMO operations. According to these techniques, a wireless communication device (e.g., an AP or like device) estimates an MU signal-to-interference-plus-noise (SINR) metric for each STA in a candidate MU-MIMO group or determines grouping metrics for candidate MU-MIMO groups to enable selection of an optimal MU-MIMO group for each of one or more levels or orders (e.g., an optimal MU-2 group, MU-3 group, etc.). The MU SINR metric for each STA represents an estimate of the SINR that the STA would receive if the wireless communication device were to transmit a MIMO transmission to the candidate MU group. In this regard, expected interference associated with the MIMO transmission to the other STAs of the candidate MU group is determined and factored into the MU SINR metric for a particular STA. The grouping metric for each candidate MU-MIMO group indicates a correlation between spatial streams of MU-MIMO transmissions intended for the stations of the candidate group.

A method for wireless communication is described. The method includes selecting, by a wireless device, a first subset from a first set of candidate multi-user groups of stations. The first subset is based at least in part on first-level grouping metrics associated with the first set of candidate multi-user groups. The method also includes determining second-level grouping metrics associated with a second set of candidate multi-user groups. The second set corresponds to candidate multi-user groups having a greater number of stations or channel vectors than the first set, and the second set is based at least in part on the first subset.

A communications device is described. The communications device includes a candidate multi-user group subset selector to select a first subset from a first set of candidate multi-user groups of stations. The first subset is based at least in part on first-level grouping metrics associated with the first set of candidate multi-user groups. The method also includes a grouping metric determiner to determine second-level grouping metrics associated with a second set of candidate multi-user groups. The second set corresponds to candidate multi-user groups having a greater number of stations or channel vectors than the first set, and the second set is based at least in part on the first subset.

A communications device is described. The communications device includes means for selecting a first subset from a first set of candidate multi-user groups of stations. The first subset is based at least in part on first-level grouping metrics associated with the first set of candidate multi-user groups. The communications device also includes means for determining second-level grouping metrics associated with a second set of candidate multi-user groups. The second set corresponds to candidate multi-user groups having a greater number of stations or channel vectors than the first set, and the second set is based at least in part on the first subset.

A non-transitory computer-readable medium is described. The non-transitory computer-readable medium includes computer-readable code that, when executed, causes a device to select a first subset from a first set of candidate multi-user groups of stations. The first subset is based at least in part on first-level grouping metrics associated with the first set of candidate multi-user groups. The computer-readable code, when executed, also causes the device to determine second-level grouping metrics associated with a second set of candidate multi-user groups. The second set corresponds to candidate multi-user groups having a greater number of stations or channel vectors than the first set, and the second set is based at least in part on the first subset.

Regarding the above-described method, communication devices, and non-transitory computer-readable medium, the method, communication devices, and non-transitory computer-readable medium can eliminate potential multi-user groups of the second set and a subsequent set of candidate multi-user groups based at least in part on values of the first-level grouping metrics.

Additionally or alternatively, the method, communication devices, and non-transitory computer-readable medium can determine the first set of candidate multi-user groups of stations based at least in part on possible combinations of the stations to form MU-MIMO transmissions groups. Additionally or alternatively, the method, communication devices, and non-transitory computer-readable medium can determine the possible combinations of stations based at least in part on representing a multi-spatial stream station of the stations as multiple distinct single-spatial stream stations. Additionally or alternatively, the method, communication devices, and non-transitory computer-readable medium can select a candidate multiple-user group from the second set of candidate multiple-user groups, and identify, based at least in part on the selected candidate multiple-user group, a number of spatial streams to use when communicating with the multi-spatial stream station. Additionally or alternatively, the method, communication devices, and non-transitory computer-readable medium can eliminate one or more potential multi-user groups of the first set based at least in part on previous values of first-level grouping metrics for similar combinations of stations.

In the above method, communication devices, and non-transitory computer-readable medium, selecting the first subset from the first set of candidate multi-user groups can include selecting a single candidate multi-user group as the first subset.

Additionally or alternatively, the method, communication devices, and non-transitory computer-readable medium can select a second subset from the second set of candidate multi-user groups based at least in part on the second-level grouping metrics. Additionally or alternatively, the method, communication devices, and non-transitory computer-readable medium can determine subsequent-level grouping metrics associated with a subsequent set of candidate multi-user groups, where the subsequent set corresponds to candidate multi-user groups having a greater number of stations or channel vectors than a prior set, and the subsequent set is based at least in part on a prior subset. Additionally or alternatively, the method, communication devices, and non-transitory computer-readable medium can select a subsequent subset from the subsequent set of candidate multi-user groups based at least in part on the subsequent-level grouping metrics. Additionally or alternatively, the method, communication devices, and non-transitory computer-readable medium can cease selection of a subsequent subset from the subsequent set of candidate multi-user groups based at least in part on a comparison of the subsequent-level grouping metrics with a grouping metric threshold value.

In the above method, communication devices, and non-transitory computer-readable medium, the first set of candidate multi-user groups of stations can include a set of candidate MU-2 groups. Additionally or alternatively, the second set of candidate multi-user groups of stations can include a set of candidate MU-3 groups.

Further scope of the applicability of the described systems, methods, devices, or computer-readable media will become apparent from the following detailed description, claims, and drawings. The detailed description and specific examples are given by way of illustration only, and various changes and modifications within the scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
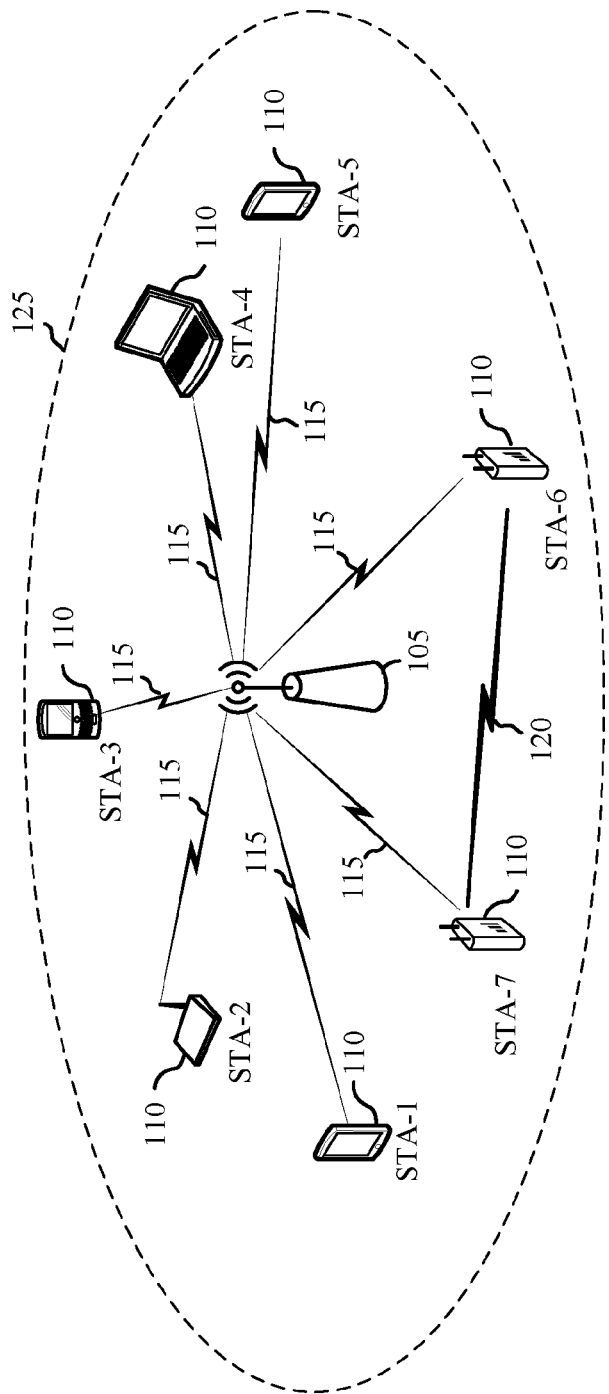
FIG. 1 illustrates an example of a wireless communication system, such as a WLAN, that supports using compressed or non-compressed beamforming information for optimizing MIMO operations in accordance with various aspects of the present disclosure.

According to aspects of the present disclosure, a wireless communication device, such as an access point (AP) utilizes techniques for using compressed or non-compressed beamforming information for optimizing multiple-input multiple-output (MIMO) operations. The AP estimates a multi-user (MU) signal-to-interference-plus-noise (SINR) metric for each station (STA) in a candidate MU group and uses the MU SINR metrics with respect to various MIMO operations. Additionally or alternatively, the AP determines grouping metrics for candidate MU-MIMO groups to enable selection of an optimal MU-MIMO group for each of one or more levels or orders (e.g., an optimal MU-2 group, MU-3 group, etc.). The AP determines the MU SINR metric for a particular STA, or a grouping metric for a particular candidate MU-MIMO group, based at least in part on compressed or non-compressed beamforming information associated with each STA in a candidate MU-MIMO group.

The beamforming information used by the AP to determine the MU SINR metrics or grouping metrics includes feedback signal-to-noise ratio (SNR) values and compressed or non-compressed beamforming feedback matrices. An MU SINR metric for a particular STA, or a grouping metric for a particular candidate MU-MIMO group, is based at least in part on the received feedback SNR values and the received beamforming feedback matrices associated with the STAs in a candidate MU group. The AP may decompress a compressed beamforming feedback matrix based at least in part on angles (e.g., phi $\Phi$ and psi $\Psi$ angles) associated with the rows and columns of the compressed beamforming feedback matrix to obtain a beamforming feedback matrix for each STA.

With the beamforming feedback matrix for each STA in a candidate MU-MIMO group, the AP determines a beamforming steering matrix associated with the candidate MU-MIMO group in accordance with some implementations. The beamforming steering matrix is based at least in part on the received SNR values and received beamforming feedback matrices (which have been decompressed if compressed) to obtain beamforming feedback matrices of the STAs in the candidate MU-MIMO group, and on the grouping metrics (e.g., on optimal MU-MIMO groups that have been identified from the candidate MU-MIMO groups). The multi-user SINR metric for each STA is, in turn, determined based at least in part on the determined beamforming steering matrix associated with a candidate MU-MIMO group.

The MU SINR metrics for the STAs provide the AP with estimations of the different levels of channel correlation and associated inter-user interference that a particular STA may experience if that particular STA were to be included in various possible MIMO transmission groupings. As such, the AP forms efficient MU groups of STAs for MIMO transmissions as well as accurately determines a proper modulation and coding scheme (MCS) for each STA in the corresponding MU transmission group. The MCS for each STA is based at least in part on the MU SINR metrics. For example, the AP may determine MU SINR metrics for the STAs in an MU group and map the MU SINR metric of a particular STA to a MCS (e.g., selecting from predefined MCSs corresponding to a value or range of values associated with the MU SINR metrics).

By contrast, certain conventional APs solely utilize packet error rate (PER) history to decide the MCS to be utilized for a STA in a MIMO group. However, if a STA joins a poor MU group (e.g., having large channel correlation and inter-user interference during the MIMO transmission), the resulting PER for that transmission occurrence can significantly impact the PER history and improperly lower MCS for that STA. If that STA then joins a good MU group (e.g., having small channel correlation and negligible inter-user interference during the MIMO transmission), that STA can still use an artificially low MCS based on the PER-based rate adaptation practices associated with a conventional AP.

Advantageously, an AP in accordance with aspects of the present disclosure sets the MCS of a particular STA based at least in part on the MU SINR metrics associated with candidate MU-MIMO group(s). Moreover, the AP determines a correlation metric based at least in part on, or independent of, the MU SINR metrics. For example, the correlation metric can be an average, median, or mean distribution of the MU SINR metrics of the STAs for a candidate MU-MIMO group. As such, the AP uses the correlation metric to determine whether the candidate MU-MIMO group is an efficient MU-MIMO transmission and whether to remove one or more STAs from the candidate MU-MIMO group. Correlation metrics relating to multiple candidate transmission groups are analyzed by the AP to detect changes and patterns associated with channel correlations among the STAs and form efficient MU transmission groups. In this regard, the AP uses the MU SINR metrics and correlation metrics to optimize MCS rate adaptation, MU grouping of STAs, MU transmission group ranking and scheduling, etc.

Advantageously, an AP in accordance with aspects of the present disclosure determines grouping metrics for various candidate MU-MIMO groups to determine the compatibility of STAs in a candidate MU-MIMO group (e.g., to determine whether the spatial streams of MU-MIMO transmissions intended for the STAs of the candidate group have good orthogonality and low cross-user interference). The AP can also select an optimal MU-MIMO group for each of one or more levels or orders (e.g., an optimal MU-2 group, MU-3 group, etc.) or identify a set of spatial streams to use for multi-spatial stream STAs. The grouping metrics, optimal MU-MIMO groups, or identified sets of spatial streams can be forwarded to a scheduler to make a final grouping/scheduling decision.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a wireless local area network (WLAN) 100 in accordance with various aspects of the present disclosure. The WLAN 100 includes an access point (AP) 105 and STAs 110 labeled as STA-1 through STA-7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 can alternatively have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 may be stationary or mobile. Additionally, each AP 105 and STA 110 can have multiple antennas.

While, the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. As such, a STA 110 or like device can include techniques for using compressed or non-compressed beamforming information for optimizing MIMO operations as described herein with respect to an AP 105.

The STAs 110 and AP 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, 802.11ax, etc. Thus, WLAN 100 implements a contention-based protocol that allows a number of devices (e.g., STAs 110 and APs 105) to share the same wireless medium (e.g., a channel) without pre-coordination. To prevent several devices from transmitting over the channel at the same time each device in a BSS operates according to certain procedures that structure and organize medium access, thereby mitigating interference between the devices.

In WLAN 100, AP 105 utilizes techniques for using compressed beamforming information (e.g., very high throughput (VHT) compressed beamforming (CBF) report information) for optimizing MIMO operations. AP 105 utilizes certain transmission techniques such as MIMO and MU-MIMO. A MIMO communication typically involves multiple transmitter antennas (e.g., at an AP 105) sending a signal or signals to multiple receive antennas (e.g., at a STA 110). Each transmitting antenna transmits independent data (or spatial) streams to increase spatial diversity and the likelihood successful signal reception. In other words, MIMO techniques use multiple antennas on AP 105 and/or multiple antennas on a STA 110 in the coverage area 125 to take advantage of multipath environments to transmit multiple data streams.

AP 105 also implements MU-MIMO transmissions in which AP 105 simultaneously transmits independent data streams to multiple STAs 110. In one example of an MU-N transmission (e.g., MU-2, MU-3, MU-4, etc.), an AP 105 simultaneously transmits signals to N STAs. Thus, when AP 105 has traffic for many STAs 110, the AP 105 increases network throughput by aggregating individual streams for each STA 110 in the group into a single MU-MIMO transmission.

In implementing various MU-MIMO techniques and operations, AP 105 (e.g., beamformer device) relies on multi-user channel sounding procedures performed with the STAs 110 (e.g., beamformee devices) in the coverage area 125 to determine how to radiate energy in a preferred direction. AP 105 sounds the channel by transmitting null data packet announcement (NDPA) frames and null data packet (NDP) frames to a number of STAs 110 such as STA-1, STA-2, STA-3, STA-4, STA-5, and STA-6. AP 105 has knowledge that STA-7 does not support MU-MIMO operations, for instance, and does not include STA-7 in the multi-user channel sounding procedure.

AP 105 also transmits a beamforming report poll frame after the NDPA and NDP frames to coordinate and collect responses from the number of STAs 110. Each of the STAs 110 responds in turn with a compressed beamforming action frame (e.g., a VHT CBF frame) for transmitting VHT CBF feedback to AP 105. The VHT CBF feedback contains the VHT CBF report information, portions of which the AP 105 uses to determine MU SINR metrics for the number of STAs 110.

The VHT CBF report information includes feedback information such as compressed beamforming feedback matrix V compressed in the form of angles (i.e., phi $\Phi$ and psi $\Psi$ angles) that are quantized according to a standard (e.g., IEEE 802.11ac). The VHT CBF report information also includes a feedback signal-to-noise ratio (SNR) value (e.g., an Average SNR of Space-Time Stream Nc, where Nc is the number of columns in the compressed beamforming feedback matrix V). Each SNR value per tone in stream i (before being averaged) corresponds to the SNR associated with the column i of the beamforming feedback matrix V determined at the STA 110. The feedback SNR values are based at least in part on the NDP frames in the channel sounding procedure, and therefore each of these feedback SNR values generally corresponds to a SNR that a particular STA 110 may experience in a single-user (SU) transmission from AP 105 to the particular STA 110.

AP 105 collects the VHT CBF report information from each STA 110 and uses the feedback information to determine the SINR metrics, grouping metrics, and beamforming steering matrices in some examples. It is to be understood that the multi-user channel sounding procedures described herein are provided as non-limiting examples. Other channel sounding procedures for obtaining compressed or non-compressed beamforming information can be used for optimizing MIMO operations as would be apparent to a skilled person given the benefit of the present disclosure.

Figure 2:
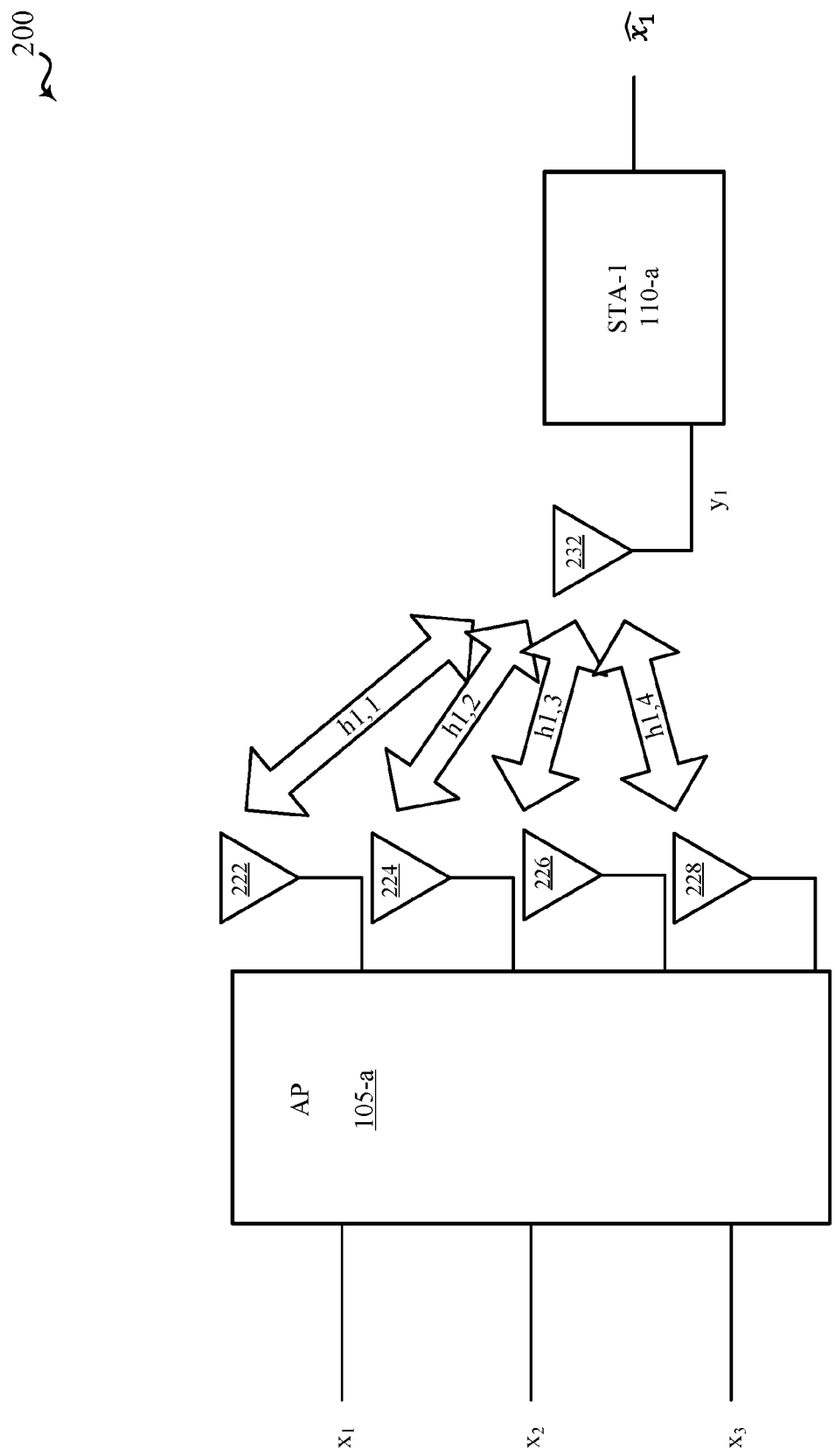
FIG. 2 illustrates an example wireless communications scenario in which a beamformer wireless device determines an MU SINR metric associated with a beamformee wireless device in accordance with various aspects of the present disclosure.

FIG. 2 illustrates an example wireless communications scenario 200 in which a beamformer wireless device determines an MU SINR metric associated with a beamformee wireless device in accordance with various aspects of the present disclosure. The example wireless communications scenario 200 shown in FIG. 2 is illustrated with respect to AP 105-a and STA 110-a, which are respective examples of the AP 105 and STAs 110 of FIG. 1. In this example, AP 105-a has received VHT CBF report information from each STA 110, STA-1 (depicted as STA 110-a in FIG. 2), STA-2, STA-3, STA-4, STA-5, and STA-6, as described with respect to FIG. 1. AP 105-a has determined to analyze a candidate MU-MIMO group consisting of STA-1, STA-2, and STA-3.

In the example wireless communications scenario 200, the number of user is 3, the number of space-time streams ($N_{STS}$) per user is 1, the number of transmit antennas ($N_{tx}$) at AP 105-a is 4, and the number of receive antennas ($N_{rx}$) at STA-1 110-a is 1. Symbols propagate from transmit antennas 222, 224, 226, 228 of AP 105-a to receive antenna 232 of STA-1 110-a by way of four separate radio paths: channel element h1,1 from first transmit antenna 222 to receive antenna 232; channel element h1,2 from second transmit antenna 224 to receive antenna 232; channel element h1,3 from third transmit antenna 226 to receive antenna 232; and channel element h1,4 from fourth transmit antenna 228 to receive antenna 232. The received signals can be expressed as follows:

$$\begin{bmatrix} y_1 \\ y_2 \\ y_3 \end{bmatrix} = H \cdot W \cdot \begin{bmatrix} x_1 \\ x_2 \\ x_3 \end{bmatrix} + n$$

where $x_1$, $x_2$, and $x_3$ are the signals for STA-1, STA-2, and STA-3, respectively, sent from the transmit antennas 222, 224, 226, 228 of AP 105-a; $y_1$, $y_2$, and $y_3$ are the signals that arrive at the receive antenna 232 of STA-1 110-a, the receive antenna of STA-2, and the receive antenna of STA-3, respectively. H expresses the way in which the transmitted symbols are attenuated, phase-shifted, distorted, etc. as the symbols travel from the transmit antennas to the receive antennas. W represents the beamforming steering matrix to transmit signals $x_1$, $x_2$, and $x_3$ as determined using the compressed or non-compressed beamforming information received by AP 105-a during the channel sounding procedure, and n represents the received noise and interference.

Thus, $y_1$ can be expressed as follows:

$$y_1 = [- \ h_1 \ -] \cdot \begin{bmatrix} | & | & | \\ w_1 & w_2 & w_3 \\ | & | & | \end{bmatrix} \cdot \begin{bmatrix} x_1 \\ x_2 \\ x_3 \end{bmatrix} + n$$

$$= h_1 w_1 x_1 + h_1 w_2 x_2 + h_1 w_3 x_3 + n$$

The expected value $\widehat{x_1}$ is the estimate of the transmitted signal $x_1$ as would be received by STA-1 110-*a*, and can be determined as follows:

$$\widehat{x_1} = \frac{(h_1 w_1)^* y_1}{|h_1 w_1|^2}$$

while the mean square error (MSE) can be expressed as follows:

$$\text{MSE} = \mathbb{E}\{(\hat{x}-x)(\hat{x}-x)^*\}$$

Thus, the mean square error can be written as follows:

$$\text{MSE} = \frac{\frac{s_1^2}{3}|v_1^* w_2|^2 + \frac{s_1^2}{3}|v_1^* w_3|^2 + 1}{s_1^2 |v_1^* w_1|^2}$$

where $s_1$ is the feedback SNR value $v_1^*$ is the decompressed or decomposed beamforming feedback matrix from compressed beamforming feedback matrix V from the compressed beamforming information provided by STA-1 during the channel sounding procedure. The beamforming steering matrix components (e.g., beamforming weights) $w_1$, $w_2$, and $w_3$ of beamforming steering matrix W are likewise determined using the compressed beamforming information provided by STA-1, STA-2, and STA-3 during the channel sounding procedure.

AP 105-*a* can then determine an MU SINR metric as would be observed by STA-1 110-*a* if AP 105-*a* were to transmit an MU-MIMO transmission to the MU-MIMO group consisting of STA-1, STA-2, and STA-3. The MU SINR metric ($\text{SINR}_{est}$) associated with STA-1 can be determined as follows:

$$\text{SINR}_{est} = \frac{\mathbb{E}\{x_1^2\}}{\text{MSE}} = \frac{\frac{s_1^2}{3}|v_1^* w_1|^2}{\frac{s_1^2}{3}(|v_1^* w_2|^2 + |v_1^* w_3|^2) + 1}$$

Similar MU SINR metrics can be determined by AP 105-*a* as would be observed by each of STA-2 and STA-3. For example, the MU SINR metric as would be observed by STA-2 if AP 105-*a* were to transmit an MU-MIMO transmission to the MU-MIMO group consisting of STA-1, STA-2, and STA-3 can be determined as follows:

$$\text{SINR}_{est} = \frac{\frac{s_2^2}{3}|v_2^* w_2|^2}{\frac{s_2^2}{3}(|v_2^* w_1|^2 + |v_2^* w_3|^2) + 1}$$

The MU SINR metric as would be observed by STA-3 if AP 105-*a* were to transmit an MU-MIMO transmission to the MU-MIMO group consisting of STA-1, STA-2, and STA-3 can be determined as follows:

$$\text{SINR}_{est} = \frac{\frac{s_3^2}{3}|v_3^* w_3|^2}{\frac{s_3^2}{3}(|v_3^* w_1|^2 + |v_3^* w_2|^2) + 1}$$

Characteristics of the disclosed equations for the MU SINR metrics ($\text{SINR}_{est}$) and similar techniques as would be apparent to a skilled person given the benefit of the present disclosure include, but are not limited to: using beamforming weights associated with a spatial stream to other STAs (e.g., a second STA, a third STA, a fourth STA, etc.) to determine the MU SINR metric for a first STA; using interference estimates associated with spatial streams from other STAs in MU-MIMO transmission at a detriment to the MU SINR metric of a first STA; and using a single-user SNR value of a first STA with interference estimates of other STAs to determine the MU SINR metric of the first STA.

Moreover, in addition to the actual values calculated using the disclosed equations, some examples of the MU SINR metric include weightings of the various components and/or approximations as determined by AP 105-*a* associated with various wireless environments and/or operational conditions.

In some embodiments, AP 105-*a* does not calculate the beamforming steering matrix W for the purpose of analyzing candidate MU-MIMO groups. Instead, AP 105-*a* utilizes a default value or a historical value (e.g., derived from the same or similar STAs under like conditions) for the beamforming steering matrix W and beamforming steering matrix components $w_1$, $w_2$, and $w_3$. For example, AP 105-*a* determines that an approximation of beamforming steering matrix W can be used based at least in part on a comparison of the received compressed or non-compressed beamforming information corresponding to a present MU SINR metric determination with previously received compressed or non-compressed beamforming information. As such, the beamforming steering matrix W determined under comparable feedback information or used for actual MU-MIMO transmission of the same or similar MU-MIMO groups of STAs can be used as an approximation of beamforming steering matrix W for the MU SINR metric calculations. In yet other embodiments, AP 105-*a* entirely eliminates the beamforming steering matrix W and beamforming steering matrix components $w_1$, $w_2$, and $w_3$ from for the MU SINR metric calculations, for example, by directly using the channel feedback values, $s_1 v_1$, $s_2 v_2$, and $s_3 v_3$, respectively, in their places in the described calculations. Such embodiments approximating or eliminating the beamforming steering matrix W from the MU SINR metric calculations can be used, for example, when temporary computational constraints exist within AP 105-*a* (e.g., in certain instances where computing an minimum mean square error (MMSE)-optimized beamforming steering matrix W is costly and/or too time intensive).

Example wireless communications scenario 200 represents one of many combinations of STAs 110 the AP 105-*a* may analyze for determining effective MU-MIMO transmission groups with which to transmit data to the number of STAs 110. In one example, AP 105-*a* determines MU SINR metrics and analyzes candidate MU-MIMO groups comprised of STA-2 and STA-3 as a possible MU-2 group, STA-1, STA-5, and STA-6 as a possible MU-3 group, and STA-3, STA-4, STA-5, and STA-6 as a possible MU-4 group.

In this example, AP 105-a determines a correlation metric among the MU SINR metrics of STA-3, STA-4, STA-5, and STA-6 as the candidate MU-4 group, and determines the MU SINR metric of STA-5 is significantly lower (e.g., by one or two standard deviations from the median of all SINR metrics of the candidate MU-4 group). As such, AP 105-a removes STA-5 from the candidate MU-4 group thereby reducing the size of the candidate MU-MIMO group to a new candidate MU-3 group. AP 105-a now determines MU SINR metrics of STA-3, STA-4, and STA-6 as the new candidate MU-3 group, and determines the MU SINR metrics of each of STA-3, STA-4, and STA-6 have increased over their respective MU SINR metrics in the former candidate MU-4 group that included STA-5. AP 110-a then blacklists STA-5 from MU-MIMO transmission groupings with any of STA-3, STA-4, and STA-6 for a predetermined period of time (e.g., 500 ms, 5 second, 30 seconds, 2 minutes, 5 minutes, etc.).

In this regard, a goal of analyzing various candidate MU-MIMO groups is to determine channel correlation patterns among the STAs 110 and identity groups of STAs 110 that exhibit good uncorrelated channel characteristics so as to form efficient MU-MIMO transmission groups. In this instance, each STA 110 in an efficient MU-MIMO transmission group exhibits a high MU SINR metric. The high MU SINR metrics of the STAs in such an efficient MU-MIMO transmission group are also correlated to high achievable high MCS rates.

In one example, AP 105-a determines MU grouping metrics (GMs) for the candidate MU-MIMO groups. A lower GM indicates more correlation and less orthogonality between the spatial streams of MU-MIMO transmissions intended for the STAs 110 included in a candidate MU-MIMO group, and a higher GM indicates less correlation and more orthogonality between the spatial streams of MU-MIMO transmissions intended for the STAs 110 included in a candidate MU-MIMO group. A GM may be based at least in part on an angle between channel vectors associated with different spatial streams (e.g., a first channel vector associated with a first spatial stream and a second channel vector associated with a second spatial stream) or an angle between a channel vector and a subspace (e.g., a first channel vector associated with a first spatial stream and a subspace associated with two or more additional spatial streams).

Figure 3A:
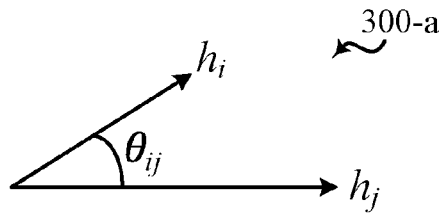
FIGS. 3A-3G show diagrams of vectors, of angles and distances between vectors, and of projections of vectors in accordance with various aspects of the present disclosure.

For a candidate MU-MIMO group of two STAs, where each STA or channel is associated with one spatial stream, the GM for the candidate MU-MIMO group can be determined based at least in part on an angle, $\theta_{ij}$, between a first channel vector, $h_i$, associated with a first spatial stream and a second channel vector, $h_j$, associated with a second spatial stream (see, e.g., the diagram 300-a of FIG. 3A). More particularly, the compatibility of grouping STA-i with STA-j, denoted $GM_{i/j}$, may be determined as follows:

$$GM_{i/j} = \sin^2\theta_{ij} = \sin^2 \angle(h_i, h_j) = 1 - \frac{|<h_i, h_j>|^2}{\|h_i\|^2 \|h_j\|^2} = GM_{j/i}$$

where $|<h_i, h_j>|^2$ is the square of the inner product of the channel vectors, and $\|h_i\|^2 \|h_j\|^2$ is the product of the squared normalizations of the channel vectors. When the two STAs are aligned (e.g., when $h_i = c^* h_j$, where c is a constant), $GM_{i/j} = 0$. When the two STAs are orthogonal (e.g., when $h_i \perp h_j$), $GM_{i/j} = 1$. In some examples, a GM is calculated per subcarrier and averaged over a plurality of subcarriers. In certain examples, the GM is averaged over all subcarriers of the received VHT CBF report information bandwidth. In other examples, to reduce complexity of the computations, the GM is averaged over a subset of subcarriers (e.g., a subset comprising every other subcarrier or a subset of subcarriers where 1 out of k subcarriers of the total bandwidth is taken such that as k increases, the computational complexity decreases).

Figure 3B:
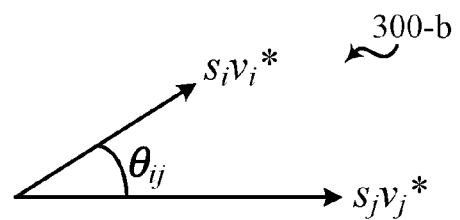

The actual channel vectors, $h_i$ and $h_j$, may be approximated as $h = sv^*$, where s is a feedback SNR value and $v^*$ is a compressed beamforming feedback matrix received in beamforming information (e.g., a VHT CBF report) after decompression and reconstruction. See, e.g., FIG. 3B, which shows a diagram 300-b of an angle $\theta_{ij}$ between channel vectors $s_i v^*_i$ and $s_j v^*_j$. The squared normalization of a channel vector may be reduced to a square of the corresponding nonzero singular values (i.e., $\|h_i\|^2 = \Sigma_l^L \lambda_{i,l}^2$, where) is the $l^{th}$ nonzero singular value for $h_i$, and L is the number of nonzero singular values). Thus, $GM_{i/j}$ may be determined as follows:

$$GM_{i/j} = \sin^2\theta_{ij} = \sin^2 \angle(s_i v^*_i, s_j v^*_j) = 1 - \frac{|<s_i v^*_i, s_j v^*_j>|^2}{\lambda_i^2 \lambda_j^2} = GM_{j/i}.$$

In the present disclosure, a reference to a channel vector, h, is understood to also reference the approximation $sv^*$.

To determine higher order GMs, lower order GMs (or intermediate GMs) may be combined. For example, for a candidate MU-MIMO group of three STAs, the compatibility of grouping STA-i with the subspace of STA-j and STA-k, denoted $GM_{i/jk}$, is determined as follows:

$GM_{i/jk} = \sin^2 \angle (h_i, \text{span}\{h_j, h_k\})$.

Similarly, the compatibility of grouping STA-j with the subspace of STA-i and STA-k, denoted $GM_{j/ik}$, and the compatibility of grouping STA-k with the subspace of STA-i and STA-j, denoted $GM_{k/ij}$, are determined as follows:

$GM_{j/ik} = \sin^2 \angle (h_j, \text{span}\{h_i, h_k\})$ $GM_{k/ij} = \sin^2 \angle (h_k, \text{span}\{h_i, h_j\})$.

Because the values of higher order GMs for a candidate MU-MIMO group (e.g., the values $GM_{i/jk}$, $GM_{j/ik}$, and $GM_{k/ij}$) may not be equal, the values may be combined to form a single GM for a candidate MU-MIMO group. Examples of a single GM for the above candidate MU-MIMO group of three STAs include a sum, such as:

$GM_{ijk} = GM_{i/jk} + GM_{j/ik} + GM_{k/ij}$ or a weighted sum that factors in the total number of spatial streams of the STAs, $N_{ss}$, in the candidate MU-MIMO group, such as:

$$GM_{ijk} = \log_2\left(1 + \frac{1}{N_{ss}}\|h_i\|^2 GM_{i/jk}\right) + \log_2\left(1 + \frac{1}{N_{ss}}\|h_j\|^2 GM_{j/ik}\right) + \log_2\left(1 + \frac{1}{N_{ss}}\|h_k\|^2 GM_{k/ij}\right).$$

The grouping metric $GM_{ijk}$ provides an approximation of the PHY rate for a candidate MU-MIMO group using relatively low-complexity computations. Alternatively, an actual PHY rate for a candidate MU-MIMO group, $R_{ijk}$, could be calculated as follows:

$$R_{ijk} = \log_2\left(1 + \frac{\|h_i w_i\|^2}{1 + \|h_i w_j\|^2 + \|h_i w_k\|^2}\right) +$$
$$\log_2\left(1 + \frac{\|h_j w_j\|^2}{1 + \|h_j w_i\|^2 + \|h_j w_k\|^2}\right) + \log_2\left(1 + \frac{\|h_k w_k\|^2}{1 + \|h_k w_i\|^2 + \|h_k w_j\|^2}\right).$$

However, the calculation of $R_{ijk}$ requires a beamforming matrix calculation based at least in part on weighting matrices, w (i.e., higher-complexity computations). It is to be appreciated that, in some implementations, the grouping metrics described herein provide a computationally inexpensive metric for estimating an SINR metric by avoiding calculations associated with a computationally-expensive weighting/precoding matrix. The SINR metric can be mapped to an MCS for a STA. In some non-limiting examples, the grouping metrics described herein provide an estimate for: correlation between the channels in a candidate MU group for determining efficient MU groupings, MU SINR for each STA in each candidate MU group, and MCS for each STA in each candidate MU group for use in dynamic rate adaptation.

For example, the MU SINR for a STA (e.g., STA i) in a candidate MU group with users j and k can be given by:

$$SINRi/jk = \frac{1}{N_{ss}}\|h_i\|^2 GM_{i/jk}$$

In this regard, a per-user MCS can be estimated based at least in part through a predetermined or pre-calculated Lookup Table mapping the MU SINR to a particular MCS.

Figure 3C:
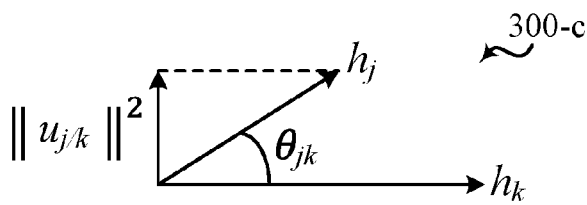

Techniques such as Gram-Schmidt orthogonalization, MATLAB calculations, chordal distance calculations, or QR decomposition calculations may be used to determine a GM for a candidate MU-MIMO group of more than two STAs. For example, Gram-Schmidt orthogonalization may be used to derive an angle, $\theta_{ij}$, between a channel vector (or more generally, a channel vector subspace) and the orthogonal complement of the subspace spanned by other channel vectors. Using Gram-Schmidt orthogonalization, the value of $GM_{i/jk}$ may be determined by determining the orthogonal complement of projecting $h_j$ on $h_k$ (i.e., $u_{j/k}$), as shown in the diagram 300-c of FIG. 3C; determining the squared normalization of $u_{i/j}$ (i.e., $\|u_{j/k}\|^2$); using $u_{j/k}$ and $\|u_{j/k}\|^2$ to determine the orthogonal complement of projecting $h_i$ on the subspace of $h_j$ on $h_k$ (i.e., $u_{i/jk}$); and determining the squared normalization of $u_{i/jk}$ (i.e., $\|u_{i/jk}\|^2$) to determine $GM_{i/jk}$:

$$u_{j/k} = h_j - \langle h_j, h_k \rangle \frac{h_k}{\|h_k\|^2}$$

$$\|u_{j/k}\|^2 = \|h_j\|^2 GM_{j/k}$$

$$u_{i/jk} = h_i - \langle h_i, u_{j/k} \rangle \frac{u_{j/k}}{\|u_{j/k}\|^2} - \langle h_i, h_k \rangle \frac{h_k}{\|h_k\|^2} = u_{i/jk}$$

$$= h_i - \left(\langle h_i, h_j \rangle - \langle h_j, h_k \rangle \frac{\langle h_i, h_k \rangle}{\|h_k\|^2}\right)$$

$$\frac{h_j - \langle h_j, h_k \rangle \frac{h_k}{\|h_k\|^2}}{\|h_j\|^2 GM_{j/k}} -$$

$$\langle h_i, h_k \rangle \frac{h_k}{\|h_k\|^2}$$

$$\|u_{i/jk}\|^2 = \|h_i\|^2 GM_{i/jk}.$$

For a candidate MU-MIMO group of four STAs, Gram-Schmidt orthogonalization may be used to determine a value of $GM_{i/jkl}$ as follows:

$$\|u_{i/jkl}\|^2 = \|h_i\|^2 GM_{i/jkl}$$

where $$u_{i/jkl} = h_i - \langle h_i, u_{j/kl} \rangle \frac{u_{j/kl}}{\|u_{j/kl}\|^2} - \langle h_i,$$

$$u_{k/l} \rangle \frac{u_{k/l}}{\|u_{k/l}\|^2} - \langle h_i, h_l \rangle \frac{h_l}{\|h_l\|^2}$$

and $$u_{j/kl} =$$

$$h_j - \left(\langle h_j, h_k \rangle - \langle h_k, h_l \rangle \frac{\langle h_j, h_l \rangle}{\|h_l\|^2}\right) \frac{h_k - \langle h_k, h_l \rangle \frac{h_l}{\|h_l\|^2}}{\|h_k\|^2 GM_{k/l}} - \langle h_j,$$

$$h_l \rangle \frac{h_l}{\|h_l\|^2}$$

and $$u_{k/l} = h_k - \langle h_k, h_l \rangle \frac{h_l}{\|h_l\|^2}.$$

Similar Gram-Schmidt orthogonalization operations may be performed for higher order GMs.

The above Gram-Schmidt orthogonalization examples assume each STA is associated with a single spatial stream. However, a STA may in some cases be associated with multiple spatial streams (e.g., a STA may be a multiple-spatial stream STA). GMs for a candidate MU-MIMO group including STA-A and STA-B, where STA-B is a multiple-spatial stream STA, may be computed by representing STA-B as multiple distinct single-spatial stream STAs. $GM_{A/B}$ may therefore be determined similarly to $GM_{i/jk}$, using the angle between $h_A$ and the subspace formed by the two channel vectors of STA-B (i.e., by projecting the channel vector $h_A$ on a subspace of channel vectors $h_{B1}$ and $h_{B2}$). $GM_{B/A}$ may not be computed similarly to $GM_{i/jk}$, because it would involve projecting a subspace onto a channel vector. However, $GM_{B/A}$ may be determined by calculating $GM_{B1/A}$ and $GM_{B2/A}$, based at least in part on $h_{B1}$ and $h_{B2}$ respectively. $GM_{B/A}$ may then be computed as an average or minimum of $GM_{B1/A}$ and $GM_{B2/A}$, using one of the following equations:

$$GM_{B/A} = \frac{1}{2}(GM_{B1/A} + GM_{B2/A})$$

$$GM_{B/A} = \min(GM_{B1/A}, GM_{B2/A}).$$

Computing $GM_{B/A}$ as a minimum of $GM_{B1/A}$ and $GM_{B2/A}$ can avoid skewing $GM_{B/A}$ too high when one of $GM_{B1/A}$ and $GM_{B2/A}$ is high and the other is low.

When a STA is associated with multiple spatial streams, an angle may be determined between a spatial stream associated with one STA (e.g., STA-A) and each of the spatial streams associated with the other STA (e.g., STA-B), similarly to the scenario in which GMs are computed for pairs of three STAs or channels. It is to be appreciated that the Gram Schmidt method and variations thereof do not require SVD operations. Thus, in some implementations, determining GMs and other associated metrics (e.g., MU SINR) utilize the Gram Schmidt methods described herein.

As another option for determining a GM for a candidate MU-MIMO group of more than two STAs, MATLAB calculations may be used to derive an angle, θ, between two vector subspaces, $A_1$ and $B_1$, where:

$$[A,S,V] = \mathrm{orth}(A_1)$$

$$[B,S,V] = \mathrm{orth}(B_1)$$

The above orth( ) operation in the MATLAB approach involves performing SVD operation and taking the first m columns of U corresponding to m nonzero singular values. The determination of these grouping metrics using MATLAB operations therefore includes the performance of at least two SVD operations. As such, the MATLAB approach is a computationally-expensive approach to determining grouping metrics.

From the vectors A and B, the projection of vector B on vector A may be computed as:

$$C = B - A(A'B)$$

and the value of sin θ may be determined as:

$$\sin(\theta) = \min(1, \|C\|)$$

Figure 3D:
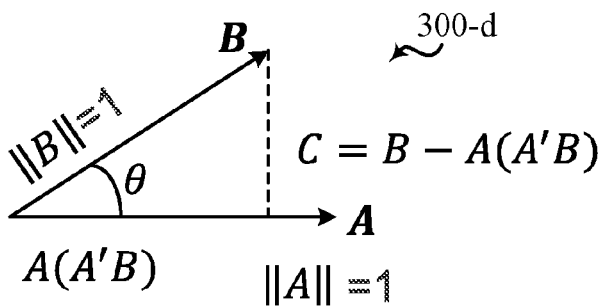

See, e.g., the diagram 300-d of FIG. 3D. The value of $GM_{A/B}$ may then be determined as:

$$GM_{A/B} = \sin(\theta)^2$$

By way of example, a value of $GM_{i/jkl}$ may be determined from the two subspaces $A_1$ and $B_1$ by setting:

$$A_1 = h_i$$

$$B_1 = [h_j \ h_k \ h_l]$$

where the channel vectors $h_j$, $h_k$, and $h_l$ are column vectors in the $B_1$ subspace.

As another option for determining a GM for a candidate MU-MIMO group of more than two STAs, chordal distance calculations may be used to determine a chordal distance, $d_{AB}$, between the two vectors A and B (see, e.g., the diagram 300-e of FIG. 3E), where:

$$d_{AB} = \frac{1}{\sqrt{2}} \|AA^H - BB^H\|_F$$

with $\|AA^H - BB^H\|_F$ being a Frobenius norm. The value of $GM_{A/B}$ may be determined as:

$$GM_{A/B} = d_{AB}^2$$

By way of example, a value of $GM_{i/jkl}$ may be determined from the two subspaces $A_1$ and $B_1$ by setting:

$$A_1 = h_i$$

$$B_1 = [h_j \ h_k \ h_l]$$

As the channel vectors become more correlated, the chordal distance between the vectors A and B decreases. The determination of each of these grouping metrics using chordal distance calculations includes the performance of at least one SVD operation.

In another option, a GM for a candidate MU-MIMO group of two or more STAs is determined by QR decomposition calculations. For example, the channel matrix is decomposed into a Q matrix and an R matrix (i.e., the channel matrix is a product of matrices Q and R). The column vectors in the Q matrix are the orthonormal basis of the column vectors in the original channel matrix, whereas the R matrix is an upper triangular matrix. In some cases, the Q matrix can be determined using Gram-Schmidt orthogonalization techniques. Using a QR decomposition approach, the values of $GM_{j/i}$ and $GM_{j/ik}$ are calculated by determining normalized projection vectors (e.g., $e_1, e_2, \ldots e_n$) where each normalized projection vector consists of all zeros except for the $i^{th}$ entry, which is one. A projection vector (e.g., $u_i$, $u_{j/i}$, etc.) is normalized by dividing the projection vector by the projection vector's square norm to obtain a unity-normalized vector in the direction of the projection vector.

By way of example, the value of $GM_{j/i}$ is determined by equating channel vector $h_i$ as projection vector $u_i$. The normalized projection vector, $e_i$, for QR decomposition is determined as:

$$e_i = \frac{u_i}{\|u_i\|^2}$$

In this regard, the normalized projection vector, $e_i$, is a unity-normalized vector in the direction of projection vector $u_i$. The orthogonal complement of projecting $h_j$ on $h_i$ (i.e., $u_{j/i}$) can be calculated as:

$$u_{j/i} = h_j - <h_j, u_i> \frac{u_i}{\|u_i\|^2}$$

The normalized projection vector, $e_j$, for QR decomposition is determined as:

$$e_j = \frac{u_{j/i}}{\|u_{j/i}\|^2}$$

Figure 3E:
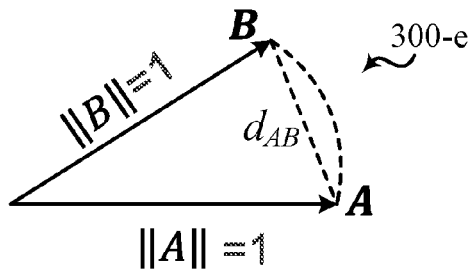
Figure 3F:
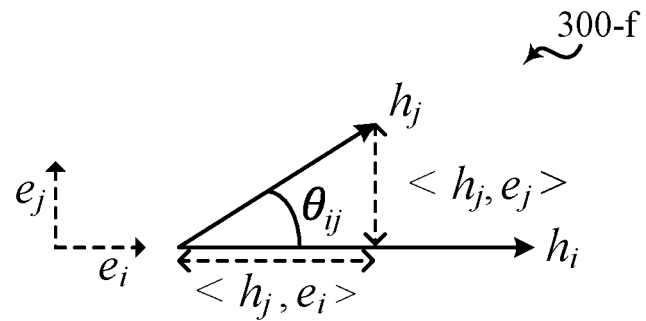

In the QR decomposition approach, the value of $GM_{j/i}$ is determined based at least in part on solving for R matrix when the vectors in the Q matrix are set to the normalized projection vectors, $e_i$ and $e_j$, so that the product of matrices Q and R is equal to the channel matrix A having channel vectors $h_i$ and $h_j$, as shown in the diagram 300-f of FIG. 3F. The value of $GM_{j/i}$ is determined using the QR decomposition approach as follows:

$$A = [h_i \ h_j]$$

and $$[Q \ R] = qr(A),$$

$$Q = [e_i \ e_j]$$

and $$R = \begin{bmatrix} <h_i, e_i> & <h_j, e_j> \\ 0 & <h_j, e_j> \end{bmatrix}.$$

The lower rightmost vector component (i.e., $<h_j, e_j>$) of the main diagonal of the upper triangular matrix R is used in calculating the grouping metric as follows:

$$GM_{j/i} = \frac{|<h_j, e_j>|^2}{\|h_j\|^2} = \frac{|R(N_{ss}, N_{ss})|^2}{\|h_j\|^2}$$

where the inner product of the channel vector $h_j$ and normalized projection vector $e_j$ is expressed as $<h_j, e_j> = h_j e'_j$, where $e'_j$ is the complex conjugate of the normalized projection vector $e_j$.

In an additional example, the value of $GM_{j/ik}$ is determined by equating channel vector $h_i$ as projection vector $u_i$. The normalized projection vector, $e_i$, for QR decomposition is determined as:

$$e_i = \frac{u_i}{\|u_i\|^2}$$

The orthogonal complement of projecting $h_k$ on $h_i$ (i.e., $u_{k/i}$) can be calculated as:

$$u_{k/i} = h_k - <h_k, h_i> \frac{u_i}{\|u_i\|^2}$$

The normalized projection vector, $e_k$, for QR decomposition is determined as:

$$e_j = \frac{u_{k/i}}{\|u_{k/i}\|^2}$$

The orthogonal complement of projecting $h_j$ on the subspace spanning vectors $h_i$ and $h_k$ (i.e., $u_{j/ik}$) can be calculated as:

$$u_{j/ki} = h_i - <h_j, u_{k/i}> \frac{u_{k/i}}{\|u_{k/i}\|^2} - <h_j, u_i> \frac{u_i}{\|u_i\|^2}$$

The normalized projection vector, $e_j$, for QR decomposition is determined as:

$$e_j = \frac{u_{j/ki}}{\|u_{j/ki}\|^2}$$

Figure 3G:
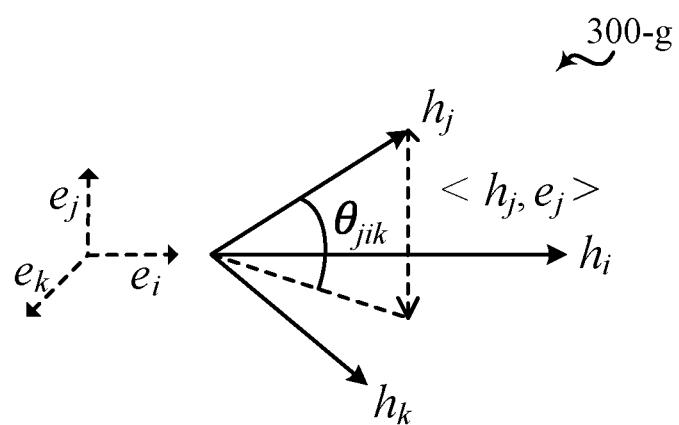

The value of $GM_{j/ki}$ is similarly determined based at least in part on solving for R matrix when the vectors in the Q matrix are set to the normalized projection vectors, $e_i$, $e_k$, and $e_j$, so that the product of matrices Q and R is equal to the channel matrix A having channel vectors $h_i$, $h_k$, and $h_j$, as shown in the diagram 300-g of FIG. 3G. The value of $GM_{j/ki}$ is determined using the QR decomposition approach as follows:

$$A = [h_i \quad h_k \quad h_j]$$

and $$[Q \quad R] = qr(A).$$

$$Q = [e_i \quad e_k \quad e_j]$$

and $$R = \begin{bmatrix} <h_i, e_i> & <h_k, e_i> & <h_j, e_i> \\ 0 & <h_k, e_k> & <h_j, e_k> \\ 0 & 0 & <h_j, e_j> \end{bmatrix}.$$

The lower rightmost vector component (i.e., $<h_j, e_j>$) of the main diagonal of the upper triangular matrix R is used in calculating the grouping metric as follows:

$$GM_{j/ki} = \frac{|<h_j, e_j>|^2}{\|h_j\|^2} = \frac{|R(N_{ss}, N_{ss})|^2}{\|h_j\|^2}$$

where the inner product of the channel vector $h_j$ and normalized projection vector $e_j$ is expressed as $<h_j, e_j> = h_j e'_j$, where $e'_j$ is the complex conjugate of the normalized projection vector $e_j$.

The above QR decomposition approach is provided as non-limiting example. Various QR decomposition approaches given the benefit of the present disclosure can be used to calculate GMs for various MU group size (e.g., $GM_{i/j}$, $GM_{i/jk}$, $GM_{i/jkl}$, etc.). Moreover, it is to be appreciated that the QR decomposition approach and variations thereof do not require SVD operations.

In some examples, the computation of higher order GMs can be simplified based at least in part on intermediate GMs (e.g., at least two pairwise GMs or lower order GMs). For example, a higher order GM can be computed as a minimum of a set of pairwise GMs or lower order GMs associated with the higher order GM, as follows:

$GM_{ijk} = \min(GM_{ij}, GM_{ik}, GM_{jk})$ $GM_{ijkl} = \min(GM_{ijk}, GM_{ijl}, GM_{jkl}, GM_{ikl})$ $GM_{ijkl} = \min(GM_{ij}, GM_{ik}, GM_{il}, GM_{jk}, GM_{jl}, GM_{kl})$ The above simplification technique may in some cases be limited to GMs at or above a certain order (e.g., GMs corresponding to candidate MU-MIMO groups of five or more STAs or channels).

The AP 105-a may in some cases determine a plurality of GMs of one or more orders and identify a perceived optimal MU-MIMO group for each order. For example, the AP 105-a may identify a perceived optimal MU-2 group, MU-3 group, and so on. For a set of M STAs, the number of candidate MU-MIMO groups from which optimal MU-MIMO groups of different order may be identified is $\Sigma_{m=2}^{M} C_m^M$. For a set of 8 STAs, the number of candidate MU-MIMO groups is 247 (plus eight SU groups). The computation of a GM for each of these candidate MU-MIMO groups can use significant resources and power and result in significant processing delays.

To reduce the number of GMs that are determined, the AP 105-a may determine first-level grouping metrics (GMs) associated with a first set of candidate MU-MIMO groups, and select a first subset of the first set of candidate MU-MIMO groups based at least in part on the first-level grouping metrics. The AP 105-a may identify a second set of candidate MU-MIMO groups based at least in part on the first subset of candidate MU-MIMO groups, and determine second-level grouping metrics associated with the second set of candidate MU-MIMO groups. Each candidate MU-MIMO group in the second set of candidate MU-MIMO groups may include a greater number of STAs or channel vectors than each candidate MU-MIMO group in the first set of candidate MU-MIMO groups. Within each selected subset of candidate MU-MIMO groups (e.g., the first subset, the second subset, etc.), a candidate MU-MIMO group of the subset may be identified as an optimal MU group. In this manner, an optimal MU2 group, optimal MU3 group, etc. may be identified (or selected). The technique described in this paragraph may be referred to as a tree-based selection technique.

Figure 4A:
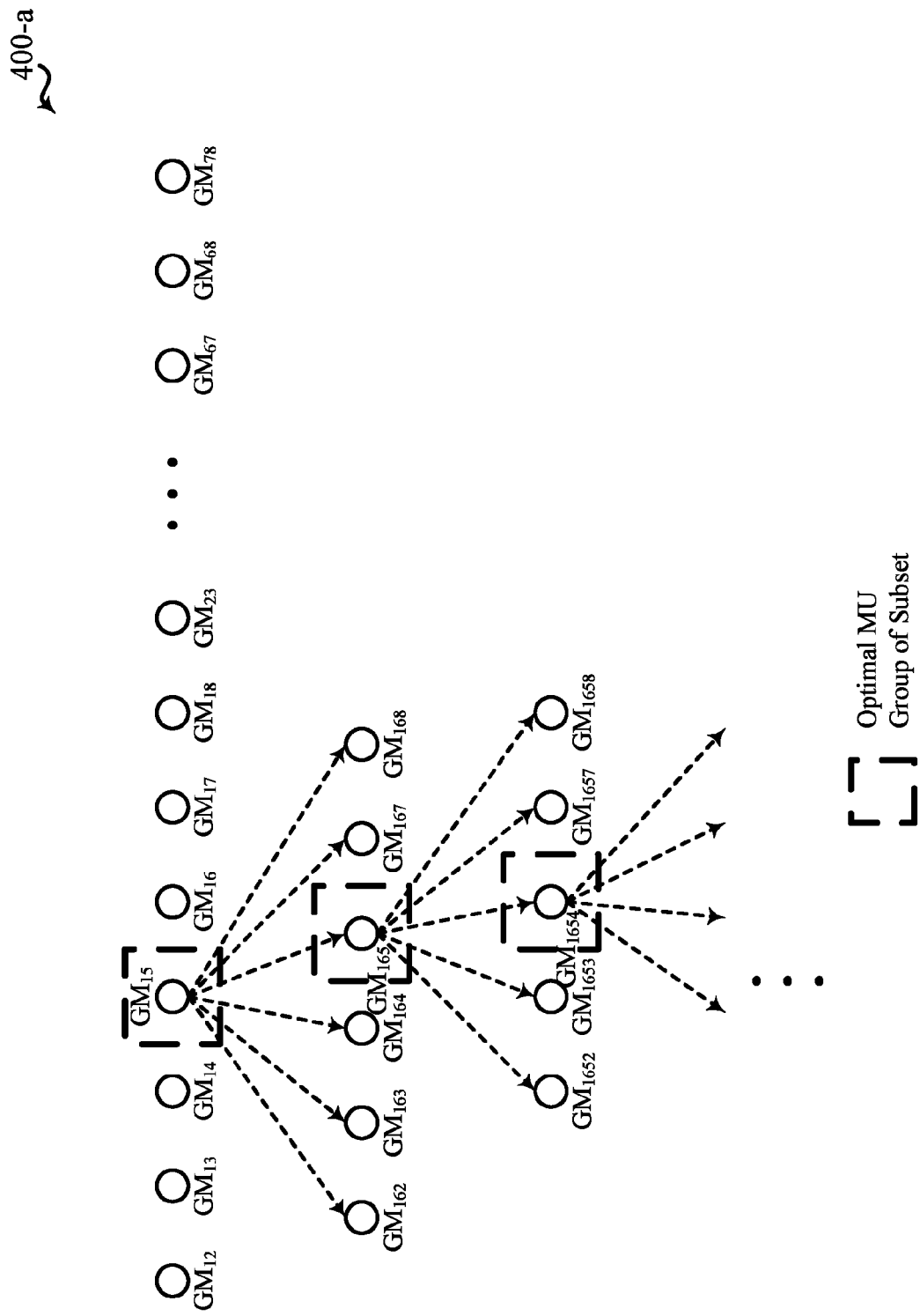
FIGS. 4A-4C show examples of candidate MU-MIMO group selection trees illustrating tree-based selection techniques in accordance with various aspects of the present disclosure.

FIG. 4A shows an example candidate MU-MIMO group selection tree 400 illustrating a first tree-based selection technique in accordance with various aspects of the present disclosure. The first tree-based selection technique can be performed by a communication device (e.g., an AP 105) in communication with a plurality of other communication devices (e.g., STAs 110). The AP 105 and STAs 110 can be examples of the AP 105 and STAs of FIGS. 1 and 2.

In FIG. 4A, the first set of candidate MU-MIMO groups includes all candidate groups of two STAs or channels, where the number of stations or channels, M, is eight, for example. The number of candidate MU-MIMO groups in the first set of candidate MU-MIMO groups is 28. First-level grouping metrics (GMs) are determined for each of the candidate MU-MIMO groups in the first set of candidate MU-MIMO groups, and a first subset of the first set of candidate MU-MIMO groups is selected based at least in part on the first-level grouping metrics. By way of example, the first subset of the first set of candidate MU-MIMO groups is shown to include a first candidate MU-MIMO group (STA-1 and STA-6, or channels 1 and 6) associated with a greatest first-level grouping metric (e.g., a first-level grouping metric, $GM_{16}$, indicating the greatest orthogonality between the members of a candidate MU-MIMO group in the first set of candidate MU-MIMO groups). The first candidate MU-MIMO group may be identified as an optimal MU-2 group. In some examples, a suboptimal subset of candidate MU-MIMO groups can be identified, and used to prune the selection tree shown in FIG. 4A, as described with reference to FIG. 4B.

A second set of candidate MU-MIMO groups includes the STA or channel of the first candidate MU-MIMO group in combination with each of the STAs or channels not included in the first candidate MU-MIMO group (e.g., a set of M−2 candidate MU-MIMO groups, or six candidate MU-MIMO groups when M=8). Second-level grouping metrics (GMs) are determined for each of the candidate MU-MIMO groups in the second set of candidate MU-MIMO groups, and a second subset of the second set of candidate MU-MIMO groups is selected based at least in part on the second-level grouping metrics. By way of example, the second subset of the second set of candidate MU-MIMO groups is shown to include a second candidate MU-MIMO group (STA-1, STA-6, and STA-5, or channels 1, 6, and 5) associated with a greatest second-level grouping metric (e.g., a second-level grouping metric, $GM_{165}$, indicating the greatest orthogonality between the members of a candidate MU-MIMO group in the second set of candidate MU-MIMO groups). The second candidate MU-MIMO group may be identified as an optimal MU-3 group.

A third set of candidate MU-MIMO groups includes the STA or channel of the second candidate MU-MIMO group in combination with each of the STAs or channels not included in the second candidate MU-MIMO group (a set of five candidate MU-MIMO groups). Third-level grouping metrics (GMs) are determined for each of the candidate MU-MIMO groups in the third set of candidate MU-MIMO groups, and a third subset of the third set of candidate MU-MIMO groups is selected based at least in part on the third-level grouping metrics. By way of example, the third subset of the third set of candidate MU-MIMO groups is shown to include a third candidate MU-MIMO group associated with a greatest third-level grouping metric (e.g., a third-level grouping metric, $GM_{1654}$, indicating the greatest orthogonality between the members of a candidate MU-MIMO group in the third set of candidate MU-MIMO groups). The third candidate MU-MIMO group may be identified as an optimal MU-4 group.

The tree-based selection technique illustrated in FIG. 4A may continue until an optimal MUM group is selected (e.g., an optimal MU-8 group, when M=8), or may be terminated when none of the grouping metric associated with a set of candidate MU-MIMO groups satisfies a minimum GM threshold (e.g., because identifying an optimal MU group not associated with the minimum GM may lead to high cross-STA (or cross-channel) interference). When the tree-based selection technique illustrated in FIG. 4A is extended to selection of an optimal MUM group, the optimal groups may be identified after determining 49 grouping metrics out of the possible 247 grouping metrics. Stated more generally, the tree-based selection technique illustrated in FIG. 4A may reduce the number of grouping metrics that need to be determined from $\Sigma_{m=2}^{M} C_m^M$ to $C_2^M + \Sigma_{m=2}^{M-1} M-m$.

Figure 4B:
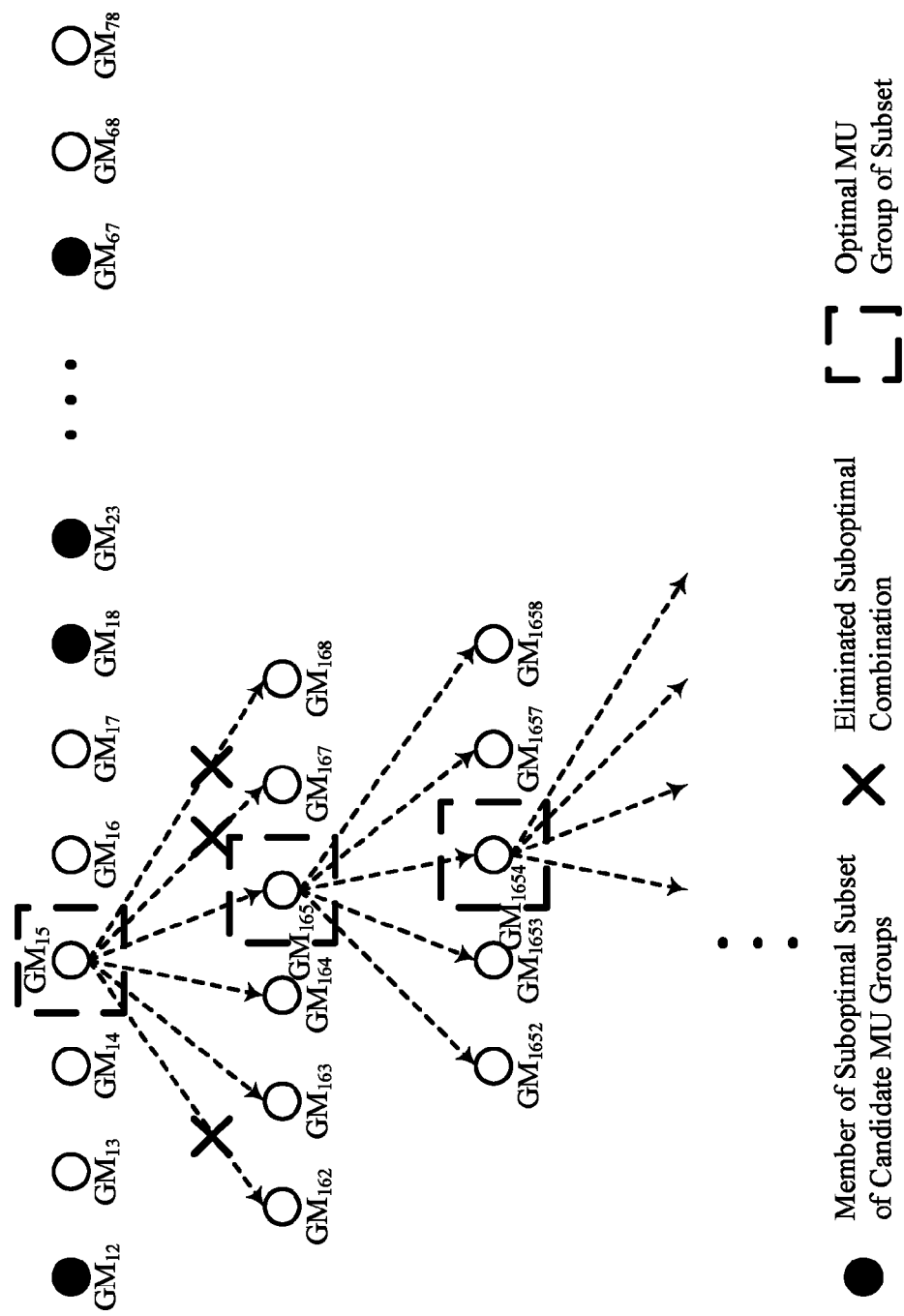

FIG. 4B shows an example candidate MU-MIMO group selection tree 400-*b* illustrating a second tree-based selection technique in accordance with various aspects of the present disclosure. The second tree-based selection technique can be performed by a communication device (e.g., an AP 105) in communication with a plurality of other communication devices (e.g., STAs 110). The AP 105 and STAs 110 can be examples of the AP 105 and STAs of FIGS. 1 and 2.

In FIG. 4B, the first set of candidate MU-MIMO groups includes all candidate groups of two STAs or channels, where the number of stations or channels, M, is eight, for example. The number of candidate MU-MIMO groups in the first set of candidate MU-MIMO groups is 28. First-level grouping metrics (GMs) are determined for each of the candidate MU-MIMO groups in the first set of candidate MU-MIMO groups, and a first subset of the first set of candidate MU-MIMO groups is selected based at least in part on the first-level grouping metrics. By way of example, the first subset of the first set of candidate MU-MIMO groups is shown to include a first candidate MU-MIMO group (a candidate MU-MIMO group including STA-1 and STA-6, or channels 1 and 6) associated with a greatest first-level grouping metric (e.g., a first-level grouping metric, $GM_{16}$, indicating the greatest orthogonality between the members of a candidate MU-MIMO group in the first set of candidate MU-MIMO groups). The first candidate MU-MIMO group may be identified as an optimal MU-2 group. In addition to identifying the first candidate MU-MIMO group, a suboptimal subset of candidate MU-MIMO groups is identified. Each candidate MU-MIMO group in the suboptimal subset of candidate MU-MIMO groups is associated with a first-level grouping metric below a threshold.

A second set of candidate MU-MIMO groups includes the STA or channel of the first candidate MU-MIMO group in combination with each of the STAs or channels not included in the first candidate MU-MIMO group (e.g., a set of M−2 candidate MU-MIMO groups, or six candidate MU-MIMO groups when M=8), less any candidate MU-MIMO group including the STAs or channels of a candidate MU-MIMO group in the suboptimal subset of candidate MU-MIMO groups (i.e., potential candidate MU-MIMO groups may be eliminated). In the example of FIG. 4B, this reduces the size of the second set of candidate MU-MIMO groups from six to three, thereby reducing the number of grouping metrics that need to be determined. Second-level grouping metrics (GMs) are determined for each of the candidate MU-MIMO groups in the second set of candidate MU-MIMO groups, and a second subset of the second set of candidate MU-MIMO groups is selected based at least in part on the second-level grouping metrics. By way of example, the second subset of the second set of candidate MU-MIMO groups is shown to include a second candidate MU-MIMO group (STA-1, STA-6, and STA-5, or channels 1, 6, and 5) associated with a greatest second-level grouping metric (e.g., a second-level grouping metric, $GM_{165}$, indicating the greatest orthogonality between the members of a candidate MU-MIMO group in the second set of candidate MU-MIMO groups). The second candidate MU-MIMO group may be identified as an optimal MU3 group.

A third set of candidate MU-MIMO groups includes the STA or channel of the second candidate MU-MIMO group in combination with each of the STAs or channels not included in the second candidate MU-MIMO group (a set of five candidate MU-MIMO groups), less any candidate MU-MIMO group including the STAs or channels of a candidate MU-MIMO group in the suboptimal subset of candidate MU-MIMO groups. In the example of FIG. 4B, this reduces the size of the second set of candidate MU-MIMO groups from five to two, thereby reducing the number of grouping metrics that need to be determined. Third-level grouping metrics (GMs) are determined for each of the candidate MU-MIMO groups in the third set of candidate MU-MIMO groups, and a third subset of the third set of candidate MU-MIMO groups is selected based at least in part on the third-level grouping metrics. By way of example, the third subset of the third set of candidate MU-MIMO groups is shown to include a third candidate MU-MIMO group associated with a greatest third-level grouping metric (e.g., a third-level grouping metric, $GM_{1654}$, indicating the greatest orthogonality between the members of a candidate MU-MIMO group in the third set of candidate MU-MIMO groups). The third candidate MU-MIMO group may be identified as an optimal MU-4 group.

The tree-based selection technique illustrated in FIG. 4B may continue until an optimal MUM group is selected (e.g., an optimal MU-8 group when M=8), or may be terminated when none of the grouping metric associated with a set of candidate MU-MIMO groups satisfies a minimum GM threshold. When the tree-based selection technique illustrated in FIG. 4B is extended to selection of an optimal MUM group, the optimal groups may be identified after determining 37-43 grouping metrics out of the possible 247 grouping metrics.

Figure 4C:
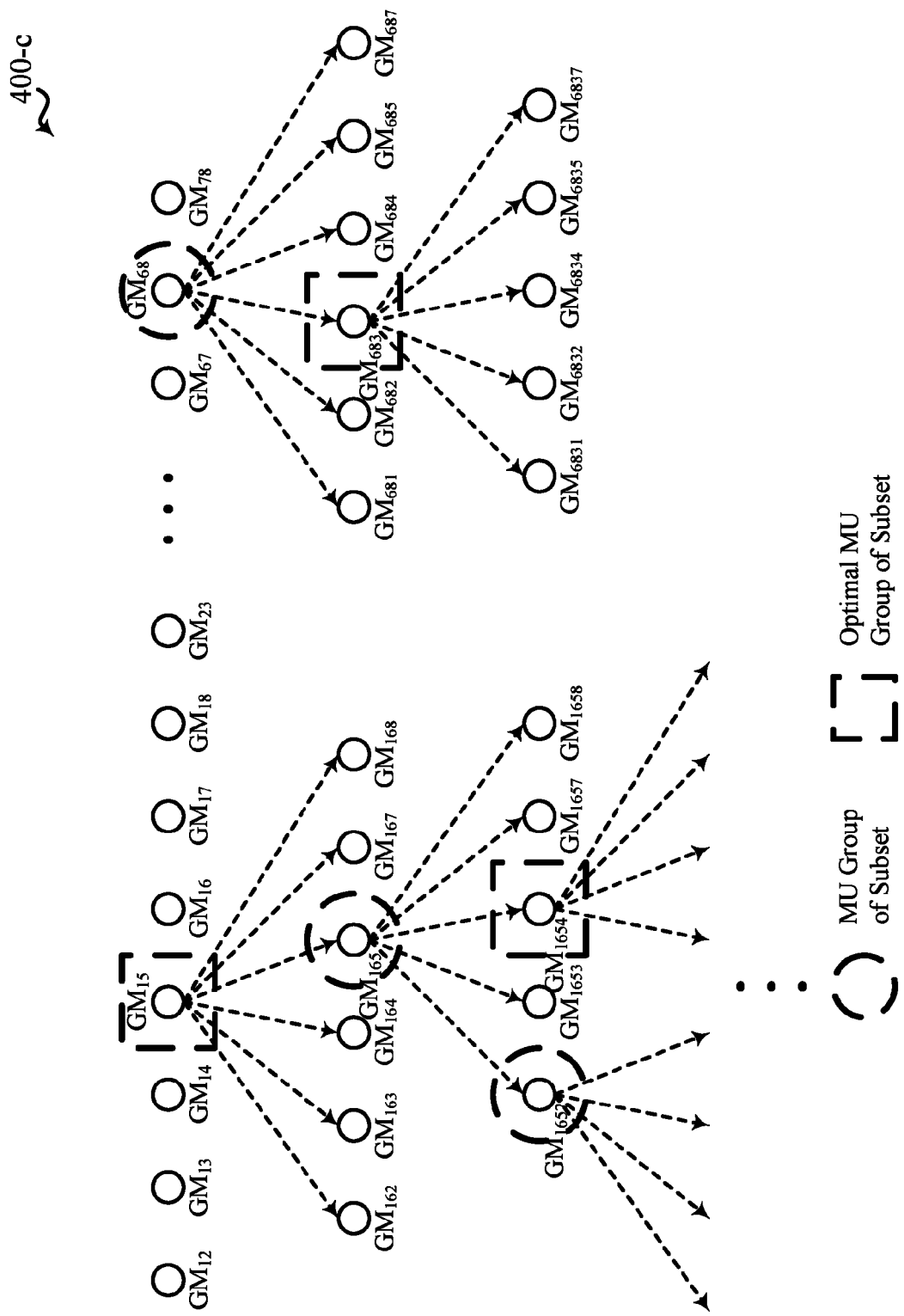

FIG. 4C shows an example candidate MU-MIMO group selection tree 400 illustrating a third tree-based selection technique in accordance with various aspects of the present disclosure. The third tree-based selection technique can be performed by a communication device (e.g., an AP 105) in communication with a plurality of other communication devices (e.g., STAs 110). The AP 105 and STAs 110 can be examples of the AP 105 and STAs of FIGS. 1 and 2.

In FIG. 4C, the first set of candidate MU-MIMO groups includes all candidate groups of two STAs or channels, where the number of stations or channels, M, is eight, for example. The number of candidate MU-MIMO groups in the first set of candidate MU-MIMO groups is 28. First-level grouping metrics (GMs) are determined for each of the candidate MU-MIMO groups in the first set of candidate MU-MIMO groups, and a first subset of the first set of candidate MU-MIMO groups is selected based at least in part on the first-level grouping metrics. By way of example, the first subset of the first set of candidate MU-MIMO groups is shown to include multiple candidate MU-MIMO groups (e.g., candidate MU-MIMO groups associated with grouping metrics $GM_{16}$ and $GM_{68}$). The multiple candidate MU-MIMO groups may include, for example, a predetermined number, p, of candidate MU-MIMO groups associated with first-level grouping metrics indicating the greatest orthogonality between the members of the candidate MU-MIMO groups, or all candidate MU-MIMO groups associated with first-level grouping metrics above a threshold. An optimal MU-2 group (e.g., an MU candidate group associated with a grouping metric indicating the greatest orthogonality between the members of the candidate MU-MIMO group) is identified from among the candidate MU-MIMO groups of the first subset. In some examples, a suboptimal subset of candidate MU-MIMO groups can be identified, and used to prune the selection tree shown in FIG. 4C, as described with reference to FIG. 4B.

A second set of candidate MU-MIMO groups includes, for each of the candidate MU-MIMO groups in the first subset, the STAs or channels of the candidate MU-MIMO group in combination with each of the STAs or channels not included in the candidate MU-MIMO group (e.g., a set of p*(M-2) candidate MU-MIMO groups, or twelve candidate MU-MIMO groups when M=8 and p=2). Second-level grouping metrics (GMs) are determined for each of the candidate MU-MIMO groups in the second set of candidate MU-MIMO groups, and a second subset of the second set of candidate MU-MIMO groups is selected based at least in part on the second-level grouping metrics. By way of example, the second subset of the second set of candidate MU-MIMO groups is shown to include multiple candidate MU-MIMO groups (e.g., candidate MU-MIMO groups associated with grouping metrics $GM_{165}$ and $GM_{683}$). The multiple candidate MU-MIMO groups may include, for example, a predetermined number of candidate MU-MIMO groups associated with second-level grouping metrics indicating the greatest orthogonality between the members of the candidate MU-MIMO groups, or all candidate MU-MIMO groups associated with second-level grouping metrics above a threshold. An optimal MU-3 group (e.g., an MU candidate group associated with a grouping metric indicating the greatest orthogonality between the members of the candidate MU-MIMO group) is identified from among the candidate MU-MIMO groups of the second subset.

A third set of candidate MU-MIMO groups includes, for each of the candidate MU-MIMO groups in the second subset, the STAs or channels of the candidate MU-MIMO group in combination with each of the STAs or channels not included in the candidate MU-MIMO group (e.g., a set of p*(M-3) candidate MU-MIMO groups, or ten candidate MU-MIMO groups when M=8 and p=2). Third-level grouping metrics (GMs) are determined for each of the candidate MU-MIMO groups in the third set of candidate MU-MIMO groups, and a third subset of the third set of candidate MU-MIMO groups is selected based at least in part on the third-level grouping metrics. By way of example, the third subset of the third set of candidate MU-MIMO groups is shown to include multiple candidate MU-MIMO groups (e.g., candidate MU-MIMO groups associated with grouping metrics $GM_{1652}$ and $GM_{1654}$). The multiple candidate MU-MIMO groups may include, for example, a predetermined number of candidate MU-MIMO groups associated with third-level grouping metrics indicating the greatest orthogonality between the members of the candidate MU-MIMO groups, or all candidate MU-MIMO groups associated with third-level grouping metrics above a threshold. An optimal MU-4 group (e.g., an MU candidate group associated with a grouping metric indicating the greatest orthogonality between the members of the candidate MU-MIMO group) is identified from among the candidate MU-MIMO groups of the third subset.

The tree-based selection technique illustrated in FIG. 4C may continue until an optimal MUM group is selected (e.g., an optimal MU-8 group when M=8), or may be terminated when none of the grouping metric associated with a set of candidate MU-MIMO groups satisfies a minimum GM threshold. When the tree-based selection technique illustrated in FIG. 4C is extended to selection of an optimal MUM group, the optimal groups may be identified after determining 70 grouping metrics out of the possible 247 grouping metrics.

When the STAs referenced in FIGS. 4A-4C are STAs associated with single spatial streams (i.e., 1ss STAs), Gram-Schmidt orthogonalization may be used to determine the needed grouping metrics. When the STAs include one or more multiple-spatial stream STAs (e.g., a 2ss STA), each multiple-spatial stream STA may be represented as a plurality of distinct 1ss STAs, and a GM may be determined for each of the 1ss STAs (e.g., $GM(h_A, h_{B1})$, $GM(h_A, h_{B2})$, etc.). The 1ss STAs representing the multiple-spatial stream STA may then be treated separately when applying the tree-based selection techniques of FIGS. 4A-4C. Alternatively, a GM may be determined for the multiple-spatial stream STA by, for example, averaging $GM(h_A, h_{B1})$, $GM(h_A, h_{B2})$, etc. When treating the 1ss STAs separately when applying a tree-based selection technique, the tree-based selection technique may determine whether a multiple-spatial stream STA should receive on all of its spatial streams or a subset of its spatial streams. When determining a GM for the multiple-spatial stream STA and applying a tree-based selection technique using the multiple-spatial stream STA GM, the tree-based selection technique is confined to using the full spatial stream capacity of the multiple-spatial stream STA.

In some examples, a lower complexity technique, such as Gram-Schmidt orthogonalization, may be used to determine grouping metrics of lower order (e.g., pairwise grouping metrics), and a higher complexity (but possibly more accurate) technique may be used to determine grouping metrics of higher order.

In some examples, the tree-based selection techniques described with reference to FIGS. 4A-4C may be based at least in part on previous values of the grouping metrics (e.g., grouping metrics that were previously determined (in time) for a first selection of optimal MU groups and reused for a subsequent (or additional) selection of optimal MU groups at a later (or subsequent) time). In some examples, just first-level grouping metrics are reused.

Figure 5A:
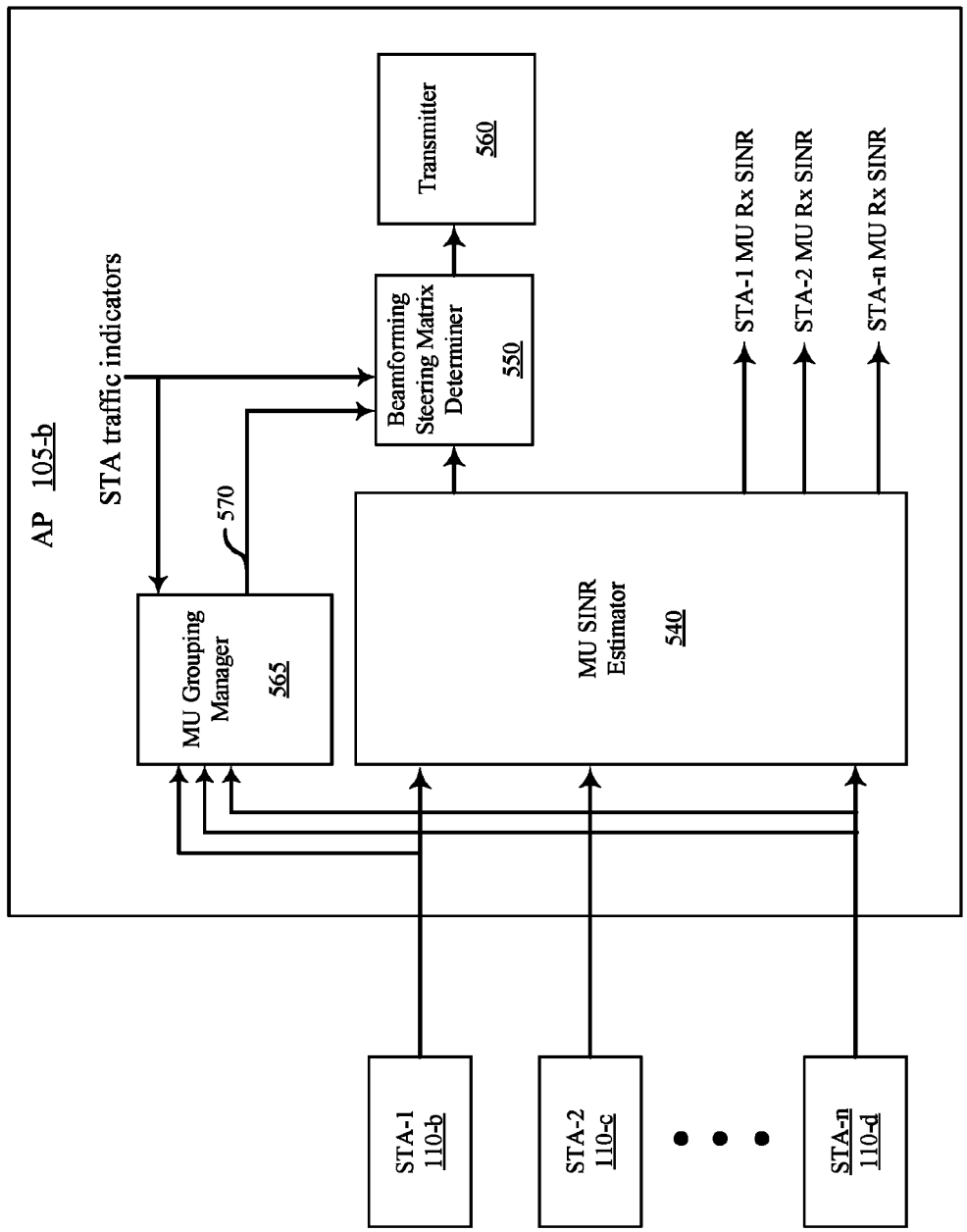
FIGS. 5A-5C show examples of block diagrams of APs receiving compressed or non-compressed beamforming information from STAs and using the received beamforming information for optimizing MIMO operations in accordance with various aspects of the present disclosure.

FIG. 5A shows an example block diagram 500-*a* of an AP receiving compressed or non-compressed beamforming information from STAs and using the received compressed or non-compressed beamforming information for optimizing MIMO operations in accordance with various aspects of the present disclosure. The example block diagram 500-*a* shown in FIG. 5A is illustrated with respect to AP 105-*b* and STAs 110-*b*, 110-*c*, 110-*d*, which are respective examples of the AP 105 and STAs 110 of FIGS. 1 and 2.

Each of STA-1 110-*b*, STA-2 110-*c*, and STA-n 110-*d* transmits compressed or non-compressed beamforming information to AP 105-*b*. MU SINR estimator 540 of AP 105-*b* processes the received compressed or non-compressed beamforming information to determine a MU SINR metric for each of STA-1 110-*b*, STA-2 110-*c*, and STA-n 110-*d* as a candidate MU-MIMO group. The MU SINR metric for each of STA-1 110-*b*, STA-2 110-*c*, and STA-n 110-*d* is determined as an estimate of the SINR that the respective STA would receive if AP 105-*c* were to transmit a MU-MIMO transmission to the candidate MU-MIMO group of STA-1 110-*b*, STA-2 110-*c*, and STA-n 110-*d*. As such, the interference associated with the calculated MU SINR metric of a particular STA 110 relates to interference that would be caused by the packets simultaneously transmitted to the other stations in a MU-MIMO transmission.

In some cases, MU SINR estimator 540 of AP 105-*b* also determines an additional MU SINR metric for each of STA-1 110-*b*, STA-2 110-*c*, and STA-n 110-*d* using different candidate MU-MIMO groups. These different candidate MU-MIMO groups include various MU-2, MU-3, MU-4, etc. group combinations of STA-1 110-*b*, STA-2 110-*c*, and STA-n 110-*d*.

In this example, MU SINR estimator 540 does not use a beamforming steering matrix W to calculate MU SINR metrics. For example, a null value, default value, or historical value for beamforming steering matrix W (e.g., as previously determined by beamforming steering matrix determiner 550) is used in the calculations of the MU SINR metrics.

Additionally, MU SINR estimator 540 of AP 105-*b* is configured to perform single-user MIMO operations in some embodiments. For example, single-user MIMO transmission parameters ($N_{ss}$, MCS) for a STA 110 are based at least in part on feedback information contained in a CBF report received from that STA 110. For each spatial stream, AP 105-*b* maps the received SNR value to a bits per second (bps) value using a constrained capacity formula such as $C=\max(\log(1+SNR), 8)$. In implementations where AP 105-*b* must transmit using a single MCS to all spatial streams, AP 105-*b* selects a minimum MCS over selection of multiple spatial streams. AP 105-*b* can choose to transmit at $N_{ss}=1, N_{ss\_total}$, and selects $N_{ss}$ such that a total throughput rate is maximized among the combinations of single-user MIMO transmission parameters ($N_{ss}$, MCS) for the STA 110.

When AP 105-*b* determines an MU-MIMO transmission group based at least in part on the determined MU SINR metrics, a beamforming steering matrix W is determined by beamforming steering matrix determiner 550, and the MU-MIMO transmission is performed by transmitter 560.

The compressed or non-compressed beamforming information transmitted by each of STA-1 110-*b*, STA-2 110-*c*, and STA-n 110-*d* can additionally or alternatively be received by the MU grouping manager 565. MU grouping manager 565 of AP 105-*b* processes the received compressed or non-compressed beamforming information to determine a grouping metric (e.g., a GM) for each of one or more of the candidate MU-MIMO groups. The grouping metric for each candidate MU-MIMO group is based at least in part on the feedback SNR values and compressed or non-compressed beamforming feedback matrices received for the STAs of the candidate MU-MIMO group, and indicates a correlation between spatial streams of MU-MIMO transmissions intended for the STAs of the candidate MU-MIMO group.

The candidate MU-MIMO groups for which grouping metrics are determined can include also possible candidate MU-MIMO groups, or one or more subsets of candidate MU-MIMO groups determined by the MU grouping manager 565. In some embodiments, the MU grouping manager 565 determines the one or more subsets of candidate MU-MIMO groups based at least in part on traffic indicators 570 received for one or more of STA-1 110-*b*, STA-2 110-*c*, and STA-n 110-*d*. The traffic indicators 570 indicate which of the STAs have data queued in a transmit queue of AP 105-*b*.

MU grouping manager 565 also identifies one or more optimal MU-MIMO groups (e.g., optimal MU-MIMO groups of different order, such as MU-2, MU-3, etc.), or an optimal set of spatial streams to be used for each of one or more of multi-spatial stream STAs included in the set of STA-1 110-b, STA-2 110-c, and STA-n 110-d.

AP 105-b can additionally or alternatively determine an MU-MIMO transmission group based at least in part on the grouping metrics, optimal MU-MIMO groups, or optimal sets of spatial streams determined or identified by the MU grouping manager 565. The AP 105-b can also determine an MU-MIMO transmission group based at least in part on the traffic indicators 570 received for one or more of STA-1 110-b, STA-2 110-c, and STA-n 110-d.

Figure 5B:
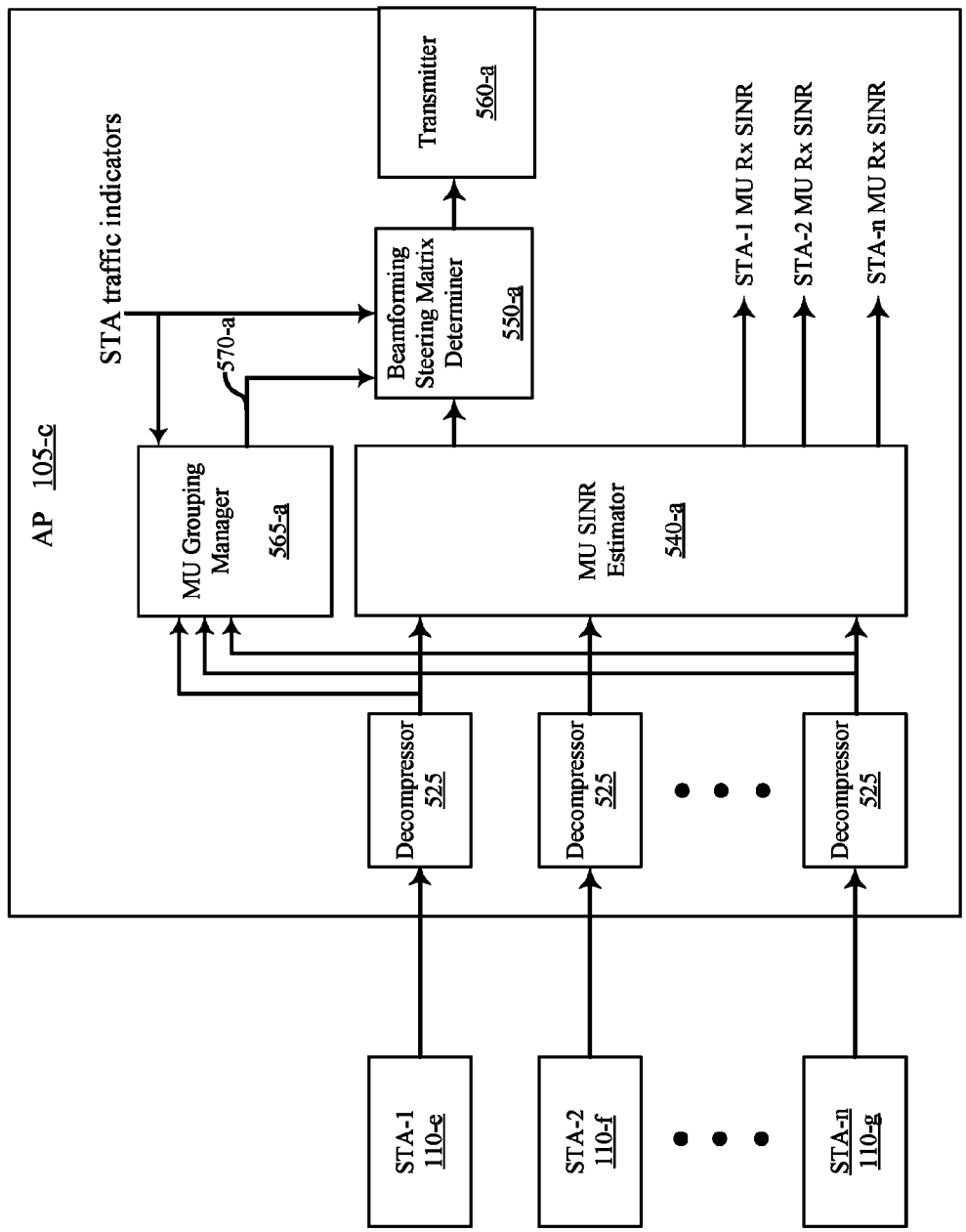

FIG. 5B shows an example block diagram 500-b of an AP receiving compressed beamforming information from STAs and using the received compressed beamforming information for optimizing MIMO operations in accordance with various aspects of the present disclosure. The example block diagram 500-b shown in FIG. 5B is illustrated with respect to AP 105-c and STAs 110-e, 110-f, 110-g, which are respective examples of the AP 105 and STAs 110 of FIGS. 1, 2, and 5A.

Each of STA-1 110-e, STA-2 110-f, and STA-n 110-g transmits compressed beamforming information to AP 105-c. Decompressor(s) 525 of AP 105-c decompresses the received compressed beamforming information. For example, decompressor 525 of AP 105-c decompresses compressed beamforming feedback matrices based at least in part on angles (e.g., phi $\phi$ and psi $\Psi$ angles) associated with the rows and columns of each compressed beamforming feedback matrix V to obtain a decompressed beamforming matrix (e.g., beamforming feedback matrix V*) for each of STA-1 110-e, STA-2 110-f, and STA-n 110-g.

MU SINR estimator 540-a of AP 105-c processes decompressed compressed beamforming feedback matrices or other received compressed beamforming information to determine a MU SINR metric for each of STA-1 110-e, STA-2 110-f, and STA-n 110-g as a candidate MU-MIMO group. In some cases, MU SINR estimator 540-a of AP 105-c also determines an additional MU SINR metric for each of STA-1 110-e, STA-2 110-f, and STA-n 110-g using different candidate MU-MIMO groups. These different candidate MU-MIMO groups include various MU-2, MU-3, MU-4, etc. group combinations of STA-1 110-e, STA-2 110-e, and STA-n 110-g.

MU grouping manager 565-a of AP 105-c additionally or alternatively processes decompressed compressed beamforming information or other received compressed beamforming information to determine a grouping metric (e.g., a GM) for each of one or more of the candidate MU-MIMO groups. In some cases, MU grouping manager 565-a of AP 105-c also identifies one or more optimal MU-MIMO groups (e.g., optimal MU-MIMO groups of different order, such as MU-2, MU-3, etc.), or an optimal set of spatial streams to be used for each of one or more of multi-spatial stream STAs included in the set of STA-1 110-e, STA-2 110-f, and STA-n 110-g.

When AP 105-c determines an MU-MIMO transmission group based at least in part on the determined or identified MU SINR metrics, grouping metrics, optimal MU-MIMO groups, optimal sets of spatial streams, or STA traffic indicators 570-a, a beamforming steering matrix W is determined by beamforming steering matrix determiner 550-a, and the MU-MIMO transmission is performed by transmitter 560-a.

Figure 5C:
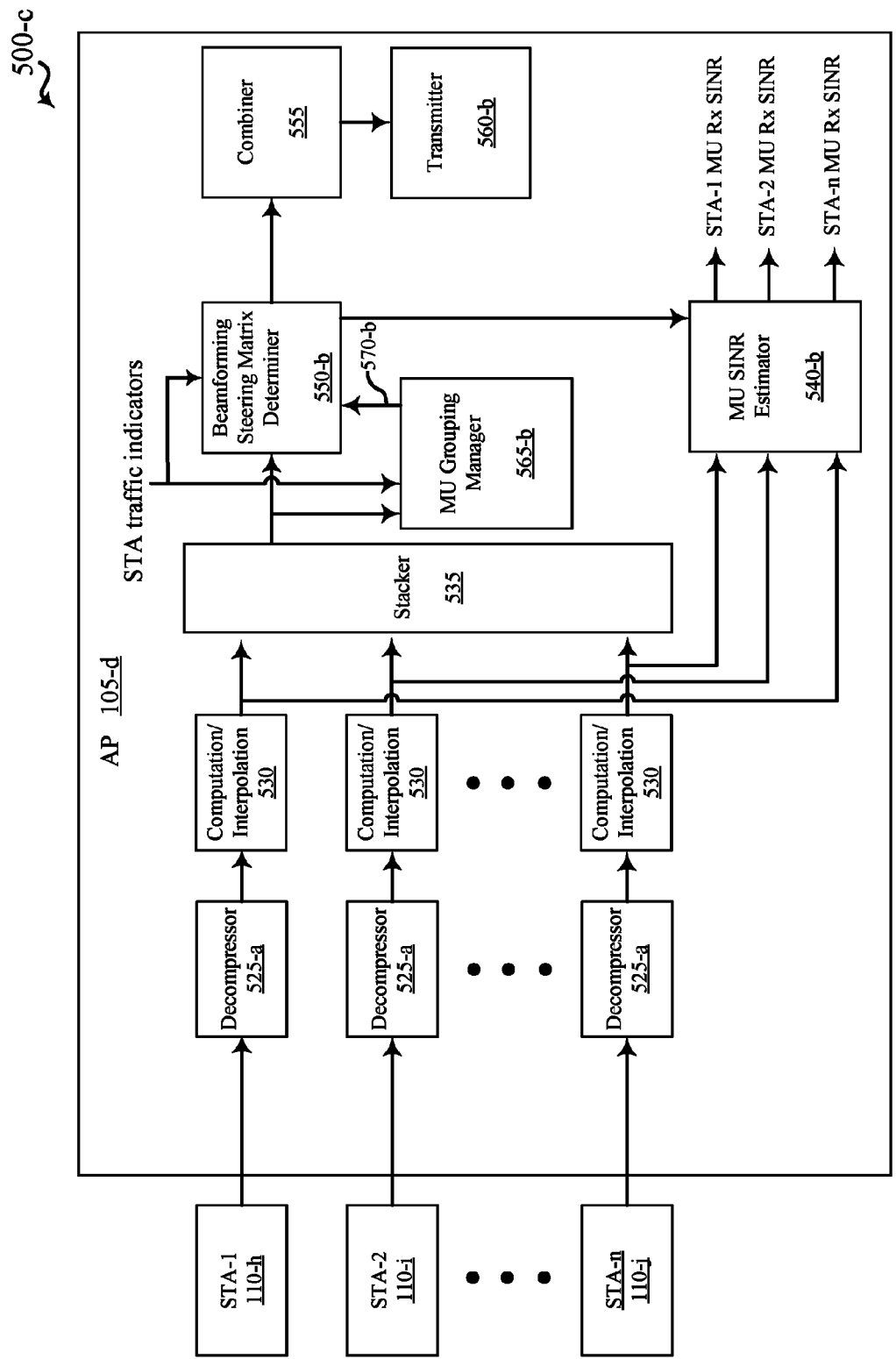

FIG. 5C shows an example block diagram 500-c of an AP receiving compressed beamforming information from STAs and using the received compressed beamforming information for optimizing MIMO operations in accordance with various aspects of the present disclosure. The example block diagram 500-c shown in FIG. 5A is illustrated with respect to AP 105-d and STAs 110-h, 110-i, 110-j, which are respective examples of the AP 105 and STAs 110 of FIGS. 1, 2, 5A, and 5B.

Each of STA-1 110-h, STA-2 110-i, and STA-n 110-j transmits compressed beamforming information to AP 105-d. Decompressor(s) 525-a of AP 105-d decompresses the received compressed beamforming information. For example, decompressor 525-a of AP 105-d decompresses compressed beamforming feedback matrices based at least in part on angles (e.g., phi $\Phi$ and psi $\Psi$ angles) associated with the rows and columns of each compressed beamforming feedback matrix V to obtain a decompressed beamforming matrix (e.g., beamforming feedback matrix V*) for each of STA-1 110-h, STA-2 110-i, and STA-n 110-j. In doing so, decompressor(s) 525-a of AP 105-d decompress the received compressed beamforming feedback matrices (e.g., regenerate the beamforming feedback matrices V*) by using a matrix multiplication operation called a Givens rotation.

Computation/interpolation blocks 530 of AP 105-d receive the decompressed compressed beamforming feedback matrices and other received compressed beamforming information (e.g., feedback SNR values, S, and beamforming feedback matrices V*). The computation/interpolation blocks 530 perform various interpolation, filtering, coding, and phase-shifting operations and forward the feedback information to both the MU SINR estimator 540-b and stacker 535. Stacker 535 stacks the feedback SNR values and beamforming feedback matrices V* and forwards the results to the MU grouping manager 565-b and beamforming steering matrix determiner 550-b. MU grouping manager 565-b determines or identifies grouping metrics, optimal MU-MIMO groups, or optimal sets of spatial streams and forwards this information to the beamforming steering matrix determiner 550-b. Beamforming steering matrix determiner 550-b determines beamforming steering matrix W associated with a MU-MIMO transmission of STA-1 110-h, STA-2 110-i, and STA-n 110-j. Beamforming steering matrix determiner 550-b provides the beamforming steering matrix W to MU SINR estimator 540-b, which in turn determines a MU SINR metric for each of STA-1 110-h, STA-2 110-i, and STA-n 110-j based at least in part on the beamforming steering matrix W.

When AP 105-d determines the MU-MIMO transmission group based at least in part on the determined or identified MU SINR metrics, grouping metrics, optimal MU-MIMO groups, optimal sets of spatial streams, or STA traffic indicators 570-b, a corresponding beamforming steering matrix W of the selected MU-MIMO transmission group is forwarded to combiner 555. Combiner 555 performs cyclic shift diversity operations, and the MU-MIMO transmission is performed by transmitter 560-b.

It is to be appreciated that the block diagrams 500-a, 500-b, 500-c of FIGS. 5A-5C show some examples of APs 105 that use compressed beamforming information to optimize MIMO operations, and other wireless communication devices can implement the techniques described herein. Wireless communication devices (including APs 105) determine MU SINR metrics and correlation metrics to optimize MCS rate adaptation, MU grouping of STAs, MU transmission group ranking and scheduling, etc. as well as other MIMO operations.

Figure 6:
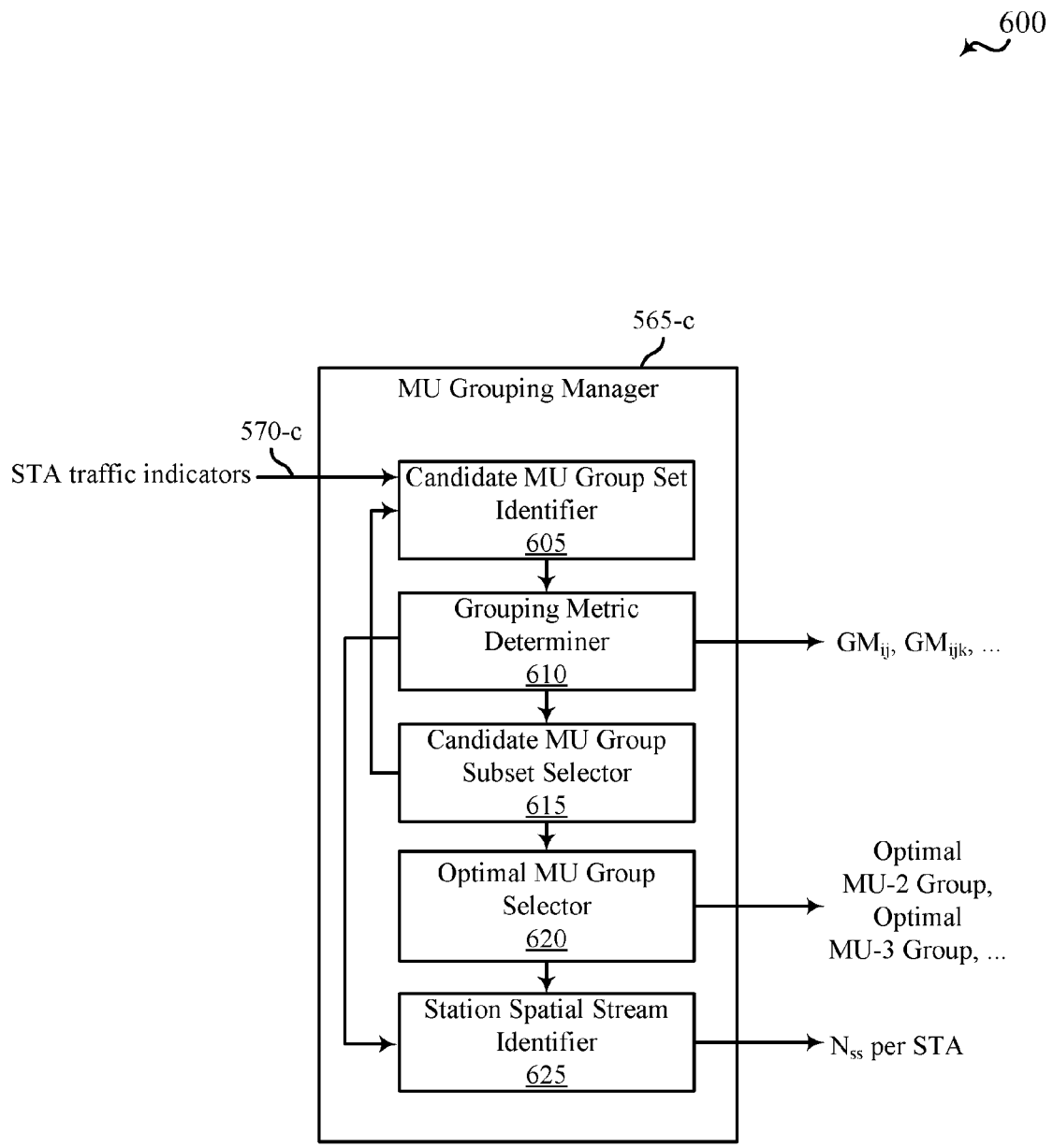
FIG. 6 shows an example block diagram of a MU grouping manager that supports using compressed or non-compressed beamforming information for optimizing MIMO operations in accordance with various aspects of the present disclosure.

FIG. 6 shows an example block diagram 600 of a MU grouping manager 565-c that supports using compressed or non-compressed beamforming information (e.g., after decompression) for optimizing MIMO operations in accordance with various aspects of the present disclosure, and with respect to FIGS. 1-5C. The MU grouping manager 565-c includes a candidate MU group set identifier 605, a grouping metric determiner 610, a candidate MU group subset selector 615, an optimal MU group selector 620, and a station spatial stream identifier 625.

The candidate MU group set identifier 605 identifies a set of candidate MU-MIMO groups. In some examples, the set of candidate MU-MIMO groups is identified based at least in part on traffic indicators 570-c received for one or more of a plurality of STAs. The traffic indicators indicate which of the STAs have data queued in a transmit queue of an AP 105. The set of candidate MU-MIMO groups identified by the candidate MU group set identifier 605 can be an initial set (e.g., a set of pairwise or MU-2 candidate MU-MIMO groups) or a subsequent set (e.g., a MU-3 or higher order set of candidate MU-MIMO groups).

The grouping metric determiner 610 determines a grouping metric (e.g., a GM, such as $GM_{ij}$, $GM_{ijk}$, etc.) for each candidate MU-MIMO group identified by the candidate MU group set identifier 605, as described for example with respect to FIGS. 2-3E.

The candidate MU group subset selector 615 selects a subset of the set of candidate MU-MIMO groups identified by the candidate MU group set identifier 605, based at least in part on the grouping metrics determined by the grouping metric determiner, as described for example with respect to FIGS. 4A-4C. The selected subset is provided to the candidate MU group set identifier, enabling the candidate MU group set identifier 605 to select a subsequent set of candidate MU-MIMO groups. A subsequent set of candidate MU-MIMO groups is identified by combining each candidate MU-MIMO group in a selected subset with each of one or more additional STAs, as also described with respect to FIGS. 4A-4C, for example.

The candidate MU group set identifier 605, grouping metric determiner 610, and candidate MU group subset selector 615 perform their operations, iteratively, until the candidate MU group set identifier 605 is unable to form a higher order set of candidate MU-MIMO groups, or until the grouping metric determiner 610 determines that none of the grouping metrics associated with a set of candidate MU-MIMO groups satisfies a minimum GM threshold.

The optimal MU group selector 620 selects an optimal MU-MIMO group (e.g., an optimal MU-2 group, an optimal MU-3 group, etc.) from each subset of candidate MU groups selected by the candidate MU group subset selector 615.

The station spatial stream identifier 625 uses the optimal MU-MIMO groups selected by the optimal MU group selector 620, and the associated grouping metrics determined by the grouping metric determiner 610, to identify a number of spatial streams to use when communicating with a multi-spatial stream station.

It is to be appreciated that the block diagram 600 of FIG. 6 shows an example of a MU grouping manager 565 that uses compressed or non-compressed beamforming information (e.g., after decompression) to optimize MIMO operations, and other MU grouping managers can implement the techniques described herein.

Figure 7A:
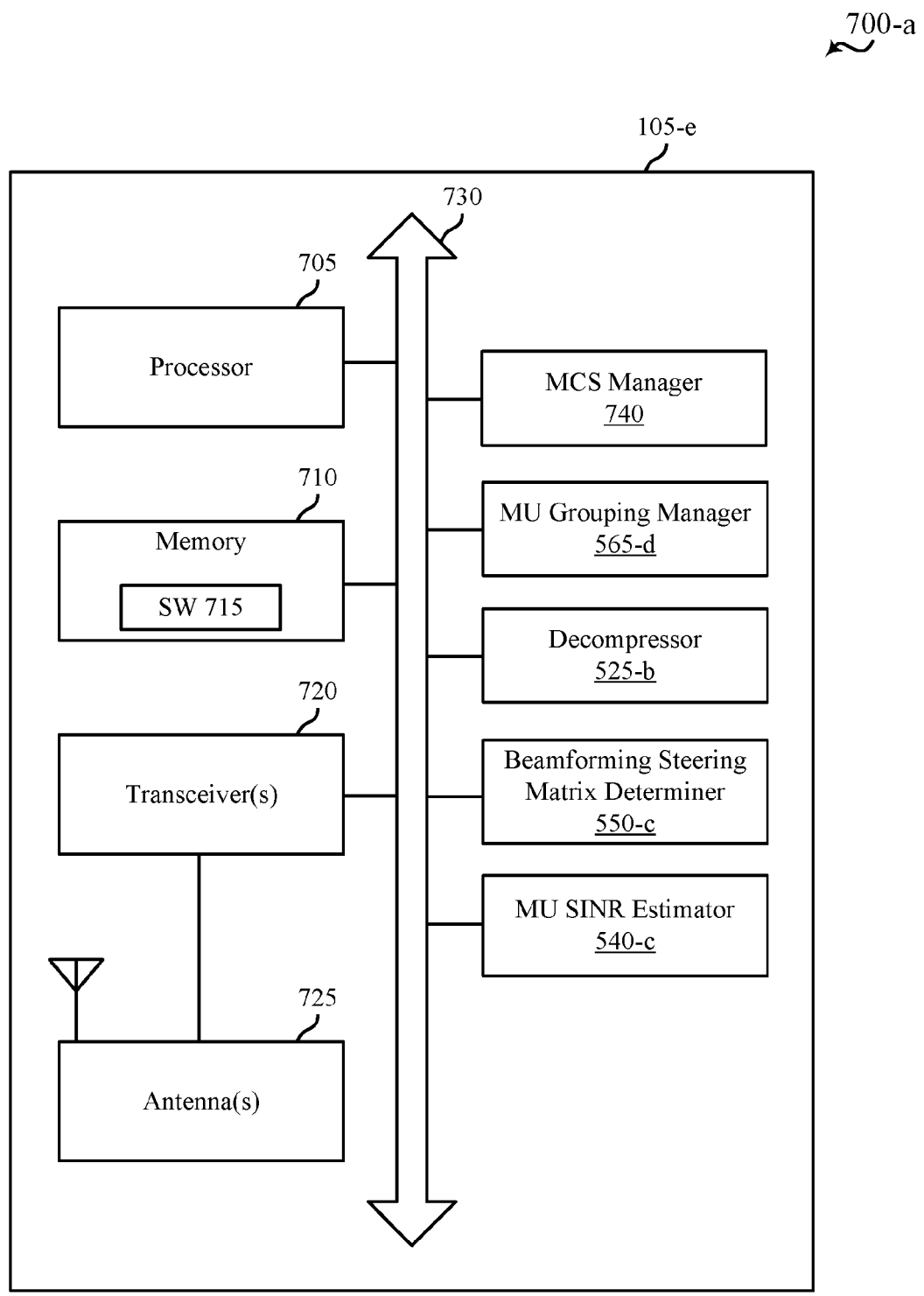
FIGS. 7A and 7B show examples of block diagrams of an AP that supports using compressed or non-compressed beamforming information for optimizing MIMO operations in accordance with various aspects of the present disclosure.

FIG. 7A shows an example block diagram 700-a of an AP 105-e that supports using compressed or non-compressed beamforming information for optimizing MIMO operations in accordance with various aspects of the present disclosure, and with respect to FIGS. 1-6. The AP 105-e includes a processor 705, a memory 710, one or more transceivers 720, one or more antennas 725, an MCS manager 740, a MU grouping manager 565-d, a decompressor 525-b, a beamforming steering matrix determiner 550-c, and a MU SINR estimator 540-c. The processor 705, memory 710, transceiver(s) 720, MCS manager 740, MU grouping manager 565-d, decompressor 525-b, beamforming steering matrix determiner 550-c, and MU SINR estimator 540-c are communicatively coupled with a bus 730, which enables communication between these components. The antenna(s) 725 are communicatively coupled with the transceiver(s) 720.

The processor 705 is an intelligent hardware device, such as a central processing unit (CPU), a microcontroller, an application-specific integrated circ$_{ui}$t (ASIC), etc. The processor 7705 processes information received through the transceiver(s) 720 and information to be sent to the transceiver(s) 720 for transmission through the antenna(s) 725.

The memory 710 stores computer-readable, computer-executable software (SW) code 715 containing instructions that, when executed, cause the processor 705 or another one of the components of the AP 105-e to perform various functions described herein, for example, receiving compressed or non-compressed beamforming information for a number of STAs 110 and determining MU SINR metrics, correlation metric(s), and/or grouping metric(s) associated with the STAs.

The transceiver(s) 720 communicate bi-directionally with other wireless devices, such as stations 110, other APs 105, or other devices. The transceiver(s) 720 include a modem to modulate packets and frames and provide the modulated packets to the antenna(s) 725 for transmission. The modem is additionally used to demodulate packets received from the antenna(s) 725.

The MCS manager 740, MU grouping manager 565-d, decompressors 525-b, beamforming steering matrix determiner 550-c, and MU SINR estimator 540-c implement the features described with reference to FIGS. 1-6, as further explained below. In some embodiments, the AP 105-e may also include computation/interpolation blocks and a stacker, as described with reference to FIG. 5C.

Again, FIG. 7A shows only one possible implementation of a device executing the features of FIGS. 1-6. While the components of FIG. 7A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 7A may be implemented by a single, consolidated hardware block. For example, a single transceiver 720 chip may implement the processor 705, MCS manager 740, MU grouping manager 565-d, decompressor 525-b, beamforming steering matrix determiner 550-c, and MU SINR estimator 540-c.

Figure 7B:
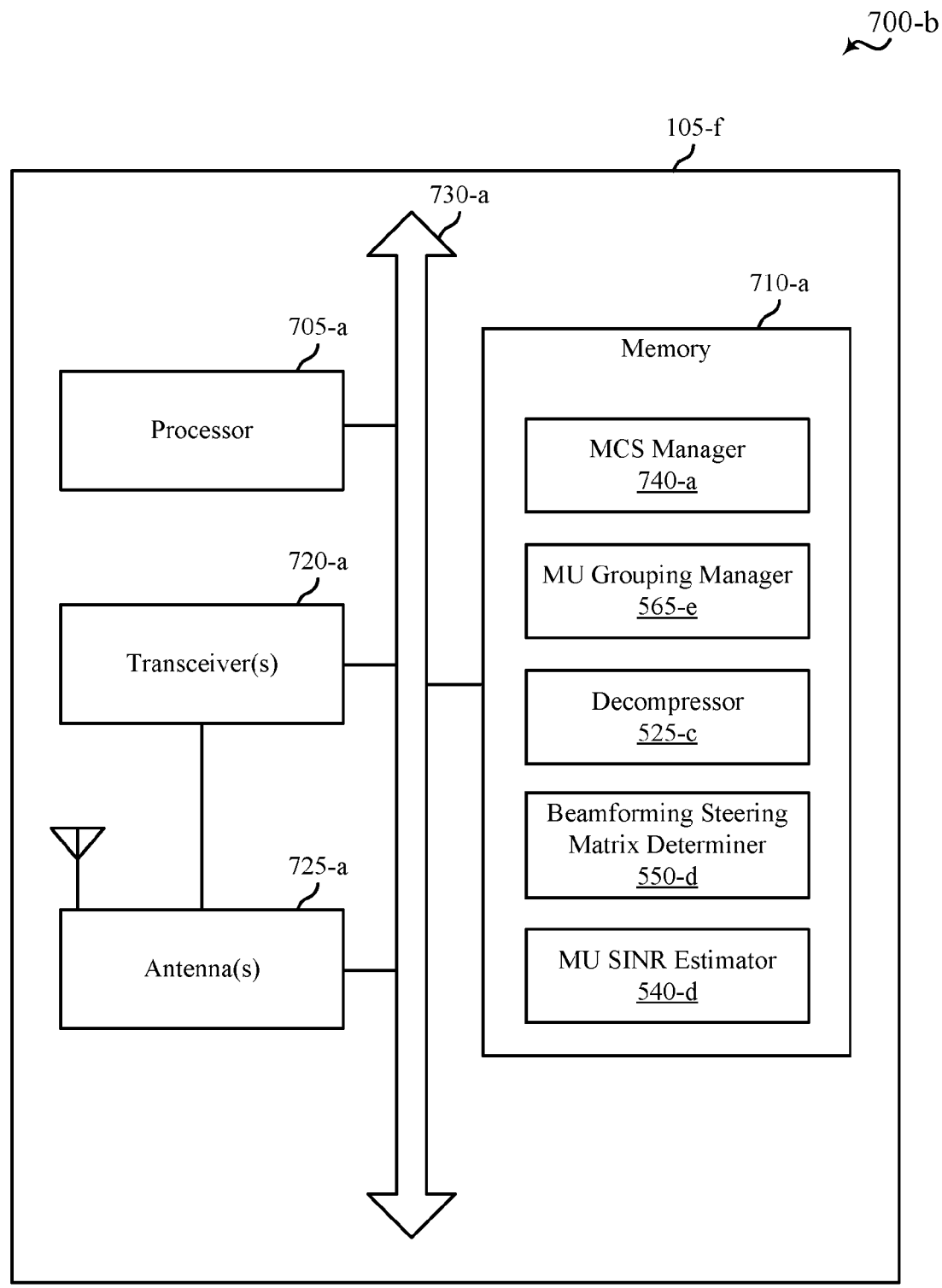

In still other examples, the features of each component may be implemented, in whole or in part, with instructions embodied in a memory, formatted to be executed by one or more general or application-specific processors. For example, FIG. 7B shows a block diagram 700-b of another example of an AP 105-f in which the features of the MCS manager 740-a, MU grouping manager 565-e, decompressors 525-c, beamforming steering matrix determiner 550-d, and MU SINR estimator 540-d are implemented as computer-readable code stored on memory 7610-a and executed by one or more processors 705-a. Other combinations of hardware/software may be used to perform the features of one or more of the components of FIGS. 7A and 7B.

Figure 8:
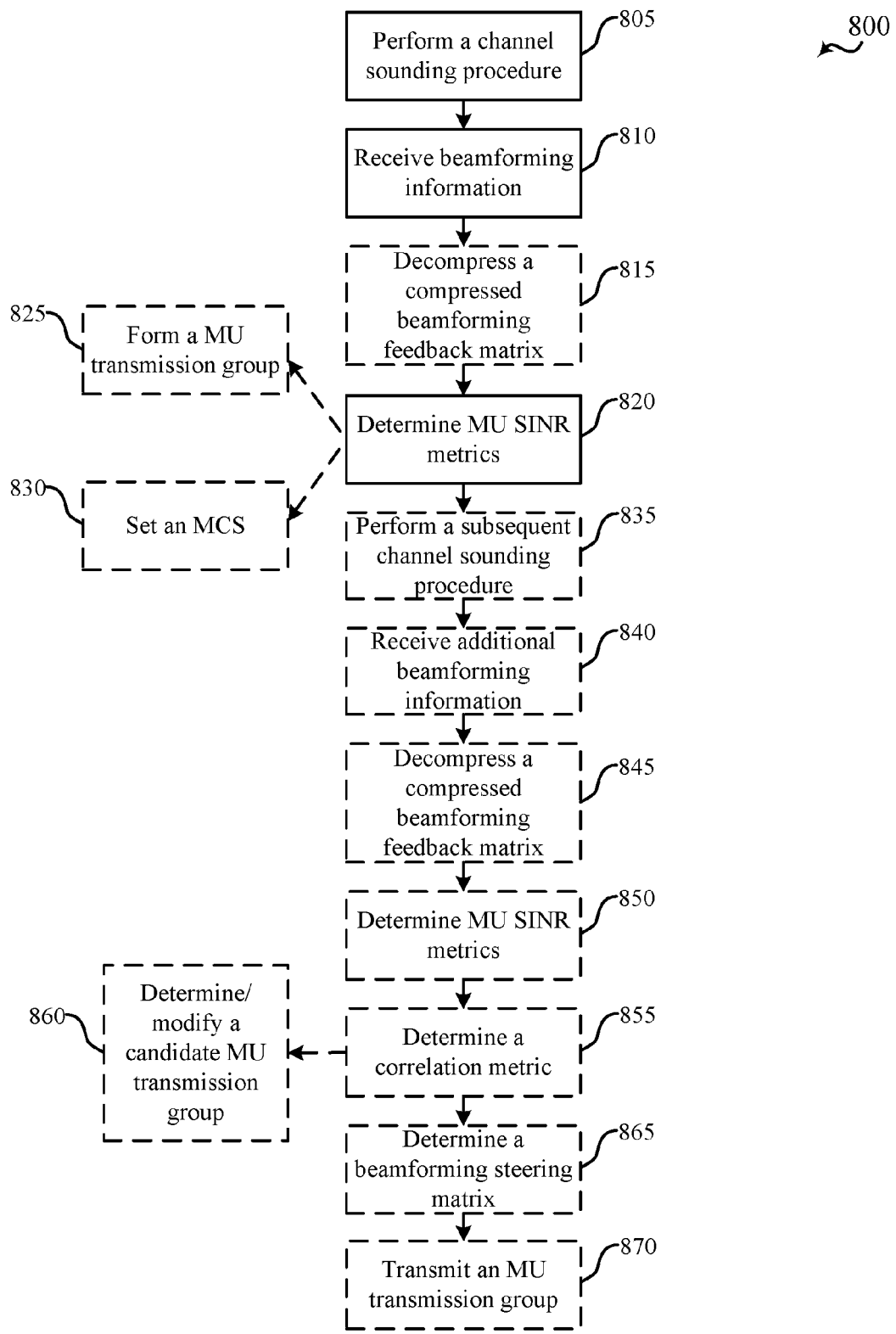
FIGS. 8 and 9 show flow charts that illustrate examples of methods for using compressed or non-compressed beamforming information for optimizing MIMO operations in accordance with various aspects of the present disclosure.

FIG. 8 shows a flow chart that illustrates one example of a method 800 for using compressed or non-compressed beamforming information for optimizing MIMO operations in accordance with various aspects of the present disclosure. Method 800 may be performed by any of the APs 105 and STAs 110 discussed in the present disclosure, but for clarity, method 800 will be described from the perspective of AP 105-*e* of FIG. 7A as the beamformer wireless device and the STAs 110 of FIG. 1 and referenced in FIG. 2 as the beamformee wireless devices. It is to be understood that method 800 is just one example of techniques for using beamforming information, and the operations of the method 800 may be rearranged, performed by other devices and component thereof, and/or otherwise modified such that other implementations are possible.

Broadly speaking, the method 800 illustrates a procedure by which the AP 105-*e* receives compressed or non-compressed beamforming information from multiple stations, the beamforming information containing a feedback SNR value and compressed or non-compressed beamforming feedback matrices, and determines a multi-user SINR metric for each station based at least in part on the received SNR values and the beamforming feedback matrices.

At block 805, transceiver 720 of the AP 105-*e* performs a channel sounding procedure. The channel sounding procedure includes the transmission of a Null Data Packet (NDP) Announcement frame to identify stations selected as beamformees. The transceiver 720 receives an acknowledgement or other response to the NDP announcement. The transceiver 720 then transmits a NDP containing training fields that are known to the beamformee stations.

At block 810, the transceiver 720 receives compressed or non-compressed beamforming information from each of a plurality of stations in response to the NDP. The beamforming information for each station includes a feedback signal-to-noise ratio (SNR) value and a compressed or non-compressed beamforming feedback matrix. According to one option, at block 815, decompressor 525-*b* decompress a compressed beamforming feedback matrix.

At block 820, MU SINR estimator 540-*c* determines a multi-user signal-to-interference-plus noise ratio (SINR) metric for each of the beamformee stations based at least in part on the received feedback SNR values and the beamforming feedback matrices. The SINR metric is determined according to the principles described in FIGS. 1, 2, 5A, and 5B. The AP 105-*e* can use the MU SINR metric for the stations in a number of ways. According to a second option, at block 825, MU grouping manager 565-*d* forms a MU transmission group based at least in part on the determined MU SINR metrics. According to another option, at block 830 MCS manager 740 sets an MCS for one or more of the stations based at least in part on the determined MU SINR metrics.

At block 835, transceiver 720 performs a subsequent channel sounding procedure. The subsequent channel sounding procedure is the same as or substantially similar to the channel sounding procedure of block 805. At block 840, transceiver 720 receives an additional set of compressed or non-compressed beamforming information from the stations selected as beamformees. According to one option, at block 845, decompressor 525-*b* decompress a compressed beamforming feedback matrix. At block 850, MU SINR estimator 540-*c* determines additional MU SINR metrics based at least in part on the new beamforming information.

At block 855, MU grouping manager 565-*d* identifies one or more correlation metrics between stations using the MU SINR metrics from the first and second sounding procedures. Based at least in part on the correlation metric(s), at block 860, MU grouping manager 565-*d* forms one or more new MU transmission groups or modifies one or more existing MU transmission groups. The MU grouping manager 565-*d* takes these actions to group closely correlated stations together. According to one option, at block 865, beamforming steering matrix determiner 550-*c* determines a beamforming steering matrix from the decompressed beamforming feedback matrices. At block 870, transceiver 720 transmits to an MU transmission group based at least in part on the determined MU SINR metrics.

Figure 9:
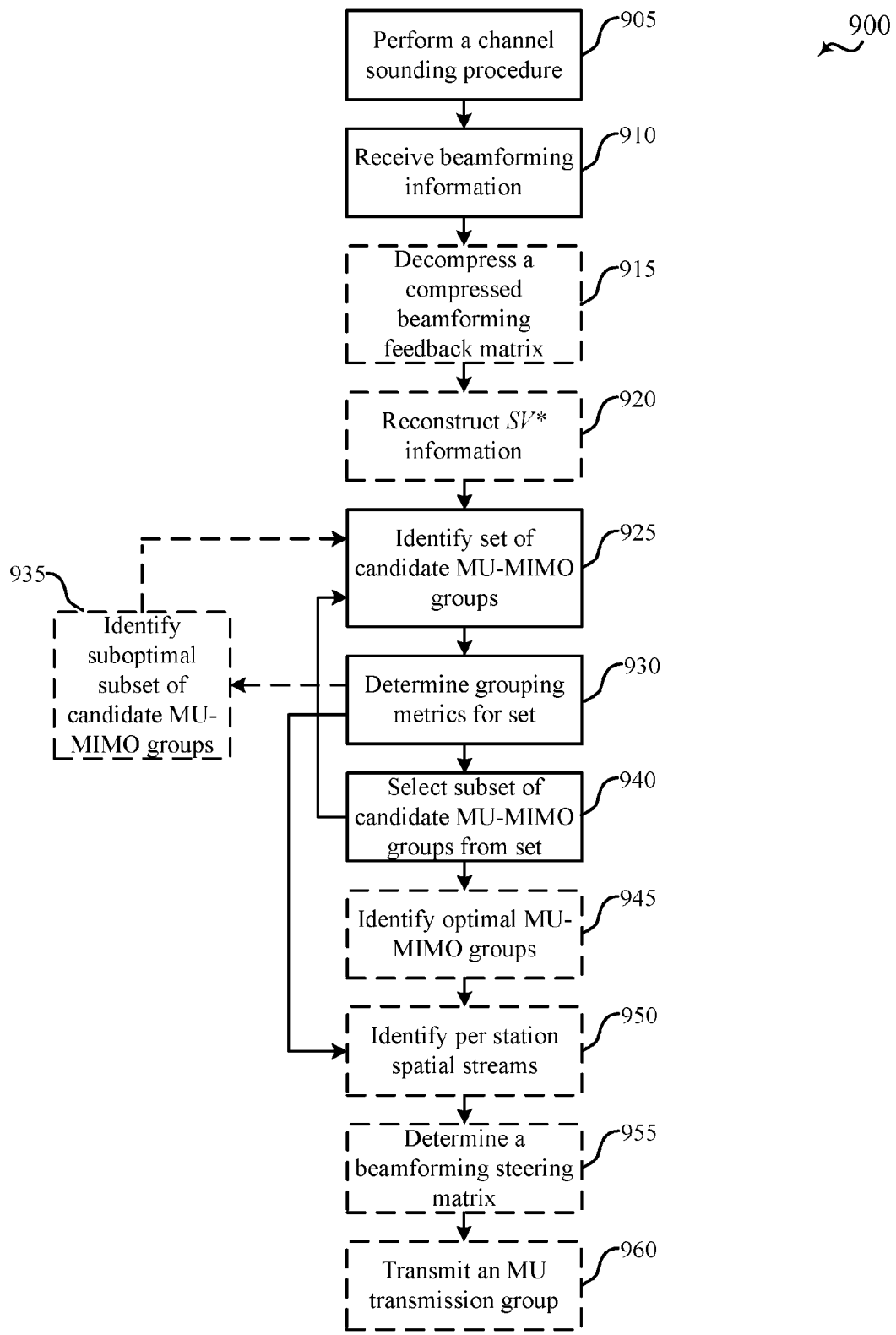

FIG. 9 shows a flow chart that illustrates one example of a method 900 for using compressed or non-compressed beamforming information for optimizing MIMO operations in accordance with various aspects of the present disclosure. Method 900 may be performed by any of the APs 105 and STAs 110 discussed in the present disclosure, but for clarity, method 900 will be described from the perspective of AP 105-*e* of FIG. 7A as the beamformer wireless device and the STAs 110 of FIG. 1 and referenced in FIG. 2 as the beamformee wireless devices. It is to be understood that method 900 is just one example of techniques for using beamforming information, and the operations of the method 900 may be rearranged, performed by other devices and component thereof, and/or otherwise modified such that other implementations are possible.

Broadly speaking, the method 900 illustrates a procedure by which the AP 105-*e* receives compressed or non-compressed beamforming information from multiple stations, the beamforming information containing a feedback SNR value and compressed or non-compressed beamforming feedback matrices, and determines at least one of grouping metrics, optimal MU-MIMO groups, or optimal sets of spatial streams for each station based at least in part on the received SNR values and the beamforming feedback matrices.

At block 905, transceiver 720 of the AP 105-*e* performs a channel sounding procedure. The channel sounding procedure includes the transmission of a Null Data Packet (NDP) Announcement frame to identify stations selected as beamformees. The transceiver 720 receives an acknowledgement or other response to the NDP announcement. The transceiver 720 then transmits a NDP containing training fields that are known to the beamformee stations.

At block 910, the transceiver 720 receives compressed or non-compressed beamforming information from each of a plurality of stations in response to the NDP. The beamforming information for each station includes a feedback signal-to-noise ratio (SNR) value and a compressed or non-compressed beamforming feedback matrix. According to one option, decompressor 525-*b* decompress a compressed beamforming feedback matrix at block 915, and/or computation/interpolation blocks (as described with reference to FIG. 5C) reconstruct SV* information at block 920 (e.g., based on interpolation and when needed).

At block 925, MU grouping manager 565-*d* identifies a set of candidate MU-MIMO groups for the beamformee stations. At block 930, MU grouping manager 565-*d* determines a grouping metric (e.g., a GM) for each of the beamformee stations based at least in part on the received feedback SNR values and the beamforming feedback matrices. The grouping metrics are determined according to the principles described in FIGS. 1-4C. According to one option, at block 935, MU grouping manager 565-*d* identifies a suboptimal subset of candidate MU-MIMO groups from the grouping metrics, so the suboptimal subset of candidate MU-MIMO groups can be used to eliminate potential candidate MU-MIMO groups from sets of candidate MU-MIMO groups identified at block 925.

At block 940, the MU grouping manager 565-d selects a subset of candidate MU-MIMO groups from a set of candidate MU-MIMO groups identified at block 925. The subset of candidate MU-MIMO groups is selected based at least in part on the grouping metrics determined at block 930. A subset of candidate MU-MIMO groups selected at block 940 can be used to identify subsequent sets of candidate MU-MIMO groups (e.g., higher order sets of MU-MIMO groups), and can be used at block 945 to identify an optimal MU-MIMO group of a particular order (e.g., MU-2, MU-3, etc.). At block 950, a per station set of spatial streams may be identified for each multi-spatial stream station. A per station set of spatial streams can be identified based at least in part on the optimal MU-MIMO groups identified at block 945 and the grouping metrics determined at block 930.

According to one option, at block 955, beamforming steering matrix determiner 550-c determines a beamforming steering matrix from the decompressed beamforming feedback matrices. At block 960, transceiver 720 transmits to an MU transmission group based at least in part on the determined or identified grouping metrics, optimal MU-MIMO groups, and per station spatial streams.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
 selecting, by a wireless device, a first subset from a first set of candidate multi-user groups of stations, the first subset being based at least in part on first-level grouping metrics associated with the first set of candidate multi-user groups; and
 determining, by the wireless device, second-level grouping metrics associated with a second set of candidate multi-user groups, the second set corresponding to candidate multi-user groups having a greater number of stations or channel vectors than the first set, and the second set being based at least in part on the first subset.

2. The method of claim 1, further comprising:
eliminating potential multi-user groups of the second set and a subsequent set of candidate multi-user groups based at least in part on values of the first-level grouping metrics.

3. The method of claim 1, further comprising:
determining the first set of candidate multi-user groups of stations based at least in part on possible combinations of the stations to form multi-user multiple-input-multiple-output (MU-MIMO) transmissions groups.

4. The method of claim 3, further comprising:
determining the possible combinations of stations based at least in part on representing a multi-spatial stream station of the stations as multiple distinct single-spatial stream stations.

5. The method of claim 4, further comprising:
selecting a candidate multiple-user group from the second set of candidate multiple-user groups; and
identifying, based at least in part on the selected candidate multiple-user group, a number of spatial streams to use when communicating with the multi-spatial stream station.

6. The method of claim 3, further comprising:
eliminating one or more potential multi-user groups of the first set based at least in part on previous values of first-level grouping metrics for similar combinations of stations.

7. The method of claim 1, wherein selecting the first subset from the first set of candidate multi-user groups comprises selecting a single candidate multi-user group as the first subset.

8. The method of claim 1, further comprising:
selecting a second subset from the second set of candidate multi-user groups based at least in part on the second-level grouping metrics.

9. The method of claim 8, further comprising:
determining subsequent-level grouping metrics associated with a subsequent set of candidate multi-user groups, the subsequent set corresponding to candidate multi-user groups having a greater number of stations or channel vectors than a prior set, and the subsequent set being based at least in part on a prior subset.

10. The method of claim 9, further comprising:
selecting a subsequent subset from the subsequent set of candidate multi-user groups based at least in part on the subsequent-level grouping metrics.

11. The method of claim 9, further comprising:
ceasing selection of a subsequent subset from the subsequent set of candidate multi-user groups based at least in part on a comparison of the subsequent-level grouping metrics with a grouping metric threshold value.

12. The method of claim 1, wherein the first set of candidate multi-user groups of stations comprises a set of candidate MU-2 groups.

13. The method of claim 1, wherein the second set of candidate multi-user groups of stations comprises a set of candidate MU-3 groups.

14. A communications device, comprising:
a candidate multi-user group subset selector to select a first subset from a first set of candidate multi-user groups of stations, the first subset being based at least in part on first-level grouping metrics associated with the first set of candidate multi-user groups; and
a grouping metric determiner to determine second-level grouping metrics associated with a second set of candidate multi-user groups, the second set corresponding to candidate multi-user groups having a greater number of stations or channel vectors than the first set, and the second set being based at least in part on the first subset.

15. The communications device of claim 14, further comprising:
a candidate multi-user group set identifier to eliminate potential multi-user groups of the second set and a subsequent set of candidate multi-user groups based at least in part on values of the first-level grouping metrics.

16. The communications device of claim 14, further comprising:
a candidate multi-user group set identifier to determine the first set of candidate multi-user groups of stations based at least in part on possible combinations of the stations to form multi-user multiple-input-multiple-output (MU-MIMO) transmissions groups.

17. The communications device of claim 16, further comprising:
a candidate multi-user group set identifier to determine the possible combinations of stations based at least in part on representing a multi-spatial stream station of the stations as multiple distinct single-spatial stream stations.

18. The communications device of claim 17, wherein the candidate multi-user group subset selector selects a candidate multiple-user group from the second set of candidate multiple-user groups, the communications device further comprising:
a station spatial stream identifier to identify, based at least in part on the selected candidate multiple-user group, a number of spatial streams to use when communicating with the multi-spatial stream station.

19. The communications device of claim 16, further comprising:
a candidate multi-user group set identifier to eliminate one or more potential multi-user groups of the first set based at least in part on previous values of first-level grouping metrics for similar combinations of stations.

20. The communications device of claim 14, wherein selecting the first subset from the first set of candidate multi-user groups comprises selecting a single candidate multi-user group as the first subset.

21. The communications device of claim 14, wherein the candidate multi-user group subset selector selects a second subset from the second set of candidate multi-user groups based at least in part on the second-level grouping metrics.

22. The communications device of claim 21, wherein the grouping metric determiner determines subsequent-level grouping metrics associated with a subsequent set of candidate multi-user groups, the subsequent set corresponding to candidate multi-user groups having a greater number of stations or channel vectors than a prior set, and the subsequent set being based at least in part on a prior subset.

23. The communications device of claim 22, wherein the candidate multi-user group subset selector selects a subsequent subset from the subsequent set of candidate multi-user groups based at least in part on the subsequent-level grouping metrics.

24. The communications device of claim 22, wherein the candidate multi-user group subset selector ceases selection of a subsequent subset from the subsequent set of candidate multi-user groups based at least in part on a comparison of the subsequent-level grouping metrics with a grouping metric threshold value.

25. A communications device, comprising:
- means for selecting a first subset from a first set of candidate multi-user groups of stations, the first subset being based at least in part on first-level grouping metrics associated with the first set of candidate multi-user groups; and
- means for determining second-level grouping metrics associated with a second set of candidate multi-user groups, the second set corresponding to candidate multi-user groups having a greater number of stations or channel vectors than the first set, and the second set being based at least in part on the first subset.

26. The communications device of claim 25, further comprising:
- means for eliminating potential multi-user groups of the second set and a subsequent set of candidate multi-user groups based at least in part on values of the first-level grouping metrics.

27. The communications device of claim 25, further comprising:
- means for determining the first set of candidate multi-user groups of stations based at least in part on possible combinations of the stations to form multi-user multiple-input-multiple-output (MU-MIMO) transmissions groups.

28. The communications device of claim 27, further comprising:
- means for determining the possible combinations of stations based at least in part on representing a multi-spatial stream station of the stations as multiple distinct single-spatial stream stations.

29. The communications device of claim 28, further comprising:
- means for selecting a candidate multiple-user group from the second set of candidate multiple-user groups; and
- means for determining, based at least in part on the selected candidate multiple-user group, a number of spatial streams to use when communicating with the multi-spatial stream station.

30. A non-transitory computer-readable medium comprising computer-readable code that, when executed, causes a device to:
- select a first subset from a first set of candidate multi-user groups of stations, the first subset being based at least in part on first-level grouping metrics associated with the first set of candidate multi-user groups; and
- determine second-level grouping metrics associated with a second set of candidate multi-user groups, the second set corresponding to candidate multi-user groups having a greater number of stations or channel vectors than the first set, and the second set being based at least in part on the first subset.

* * * * *